(12) United States Patent
Horie et al.

(10) Patent No.: US 10,345,930 B2
(45) Date of Patent: Jul. 9, 2019

(54) MAGNETIC CORE COIL AND ELECTRONIC PEN

(71) Applicant: Wacom Co., Ltd., Saitama (JP)

(72) Inventors: Toshihiko Horie, Saitama (JP); Masamitsu Ito, Saitama (JP); Shigeru Yamashita, Saitama (JP); Hidetaka Takiguchi, Saitama (JP); Ryoji Kamiyama, Ibaraki (JP)

(73) Assignee: WACOM CO., LTD., Saitama (JP)

( * ) Notice: Subject to any disclaimer, the term of this patent is extended or adjusted under 35 U.S.C. 154(b) by 89 days.

(21) Appl. No.: 15/829,508

(22) Filed: Dec. 1, 2017

(65) Prior Publication Data

US 2018/0081458 A1 Mar. 22, 2018

Related U.S. Application Data

(63) Continuation of application No. PCT/JP2016/067868, filed on Jun. 16, 2016.

(30) Foreign Application Priority Data

Jun. 25, 2015 (JP) ................................ 2015-127659

(51) Int. Cl.
| | | |
|---|---|---|
| G06F 3/0354 | (2013.01) | |
| G06F 3/03 | (2006.01) | |
| G06F 3/046 | (2006.01) | |
| G06F 3/038 | (2013.01) | |
| H01F 27/255 | (2006.01) | |
| H01F 27/29 | (2006.01) | |

(Continued)

(52) U.S. Cl.
CPC ............ *G06F 3/03545* (2013.01); *G06F 3/03* (2013.01); *G06F 3/0383* (2013.01); *G06F 3/046* (2013.01); *H01F 5/04* (2013.01); *H01F 27/255* (2013.01); *H01F 27/29* (2013.01); *H01F 3/08* (2013.01)

(58) Field of Classification Search
CPC ........ G06F 3/03; G06F 3/046; G06F 3/03545; G06F 3/0383; H01F 3/08; H01F 27/29; H01F 27/255; H01F 5/04
See application file for complete search history.

(56) References Cited

U.S. PATENT DOCUMENTS

| | | |
|---|---|---|
| 8,913,041 B2 | 12/2014 | Fukushima et al. |
| 9,513,719 B2 | 12/2016 | Ito et al. |
| 9,600,095 B2 | 3/2017 | Horie et al. |

(Continued)

FOREIGN PATENT DOCUMENTS

| | | |
|---|---|---|
| JP | 7-32918 U | 6/1995 |
| JP | 2011-186803 A | 9/2011 |

(Continued)

*Primary Examiner* — Charles V Hicks
(74) *Attorney, Agent, or Firm* — Seed IP Law Group LLP

(57) ABSTRACT

A magnetic core coil has a core formed of a magnetic material, a coil wound around the core, and two terminals formed of a conductive material. The two terminals are fixed to the core, and first portions of the two terminals extend from one end of the core in an axial direction of the core. A first end and a second end of the coil are electrically connected to the first portions of the two terminals which protrude from the one end of the core in the axial direction of the core. The magnetic core coil can be made small in thickness (radial size) and size, and can be produced in a reduced number of production steps and at low cost.

16 Claims, 12 Drawing Sheets

(51) Int. Cl.
*H01F 5/04* (2006.01)
*H01F 3/08* (2006.01)

(56) References Cited

U.S. PATENT DOCUMENTS

| 2003/0122795 | A1* | 7/2003 | Fujitsuka | G06F 3/03545 |
| | | | | 345/173 |
| 2014/0043283 | A1* | 2/2014 | Kim | G06F 3/0416 |
| | | | | 345/174 |
| 2015/0130772 | A1 | 5/2015 | Katsurahira | |

FOREIGN PATENT DOCUMENTS

| JP | 2014-85308 A | 5/2014 |
| JP | 2014-150123 A | 8/2014 |
| JP | 2015-11428 A | 1/2015 |
| JP | 2015-32167 A | 2/2015 |
| WO | 2014/203670 A1 | 12/2014 |

\* cited by examiner

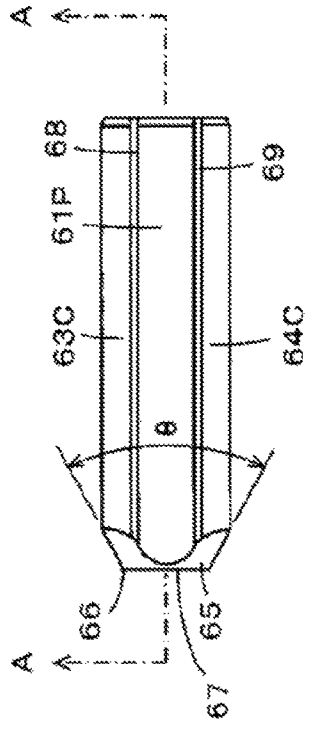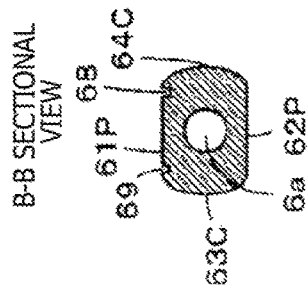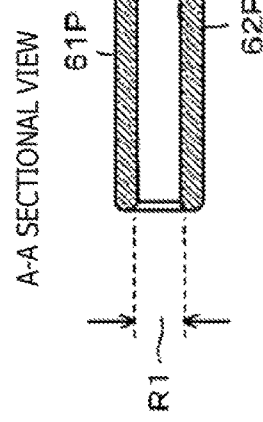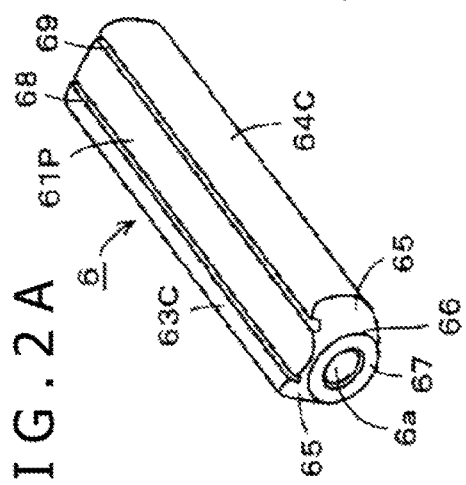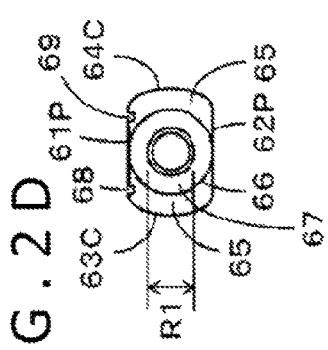

X-X SECTIONAL VIEW

Y-Y SECTIONAL VIEW

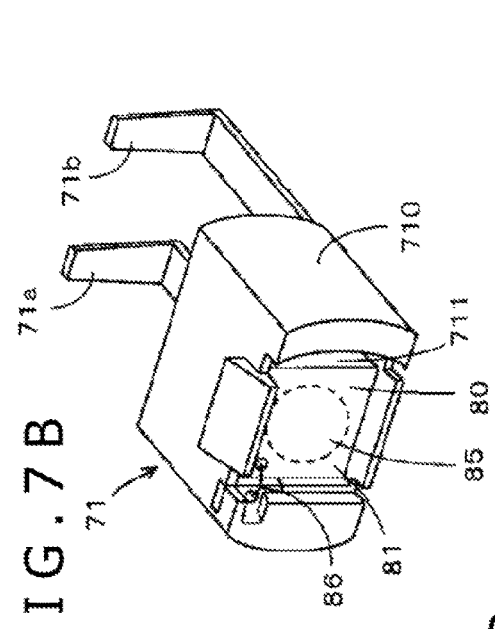
FIG. 7A
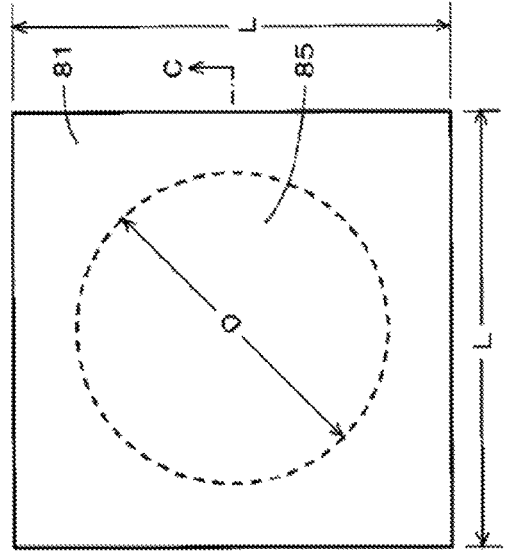
FIG. 7B
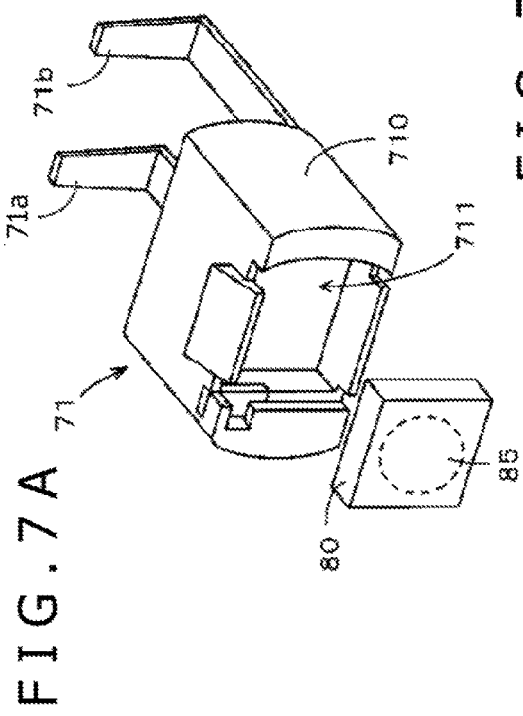
FIG. 7C C-C SECTIONAL VIEW
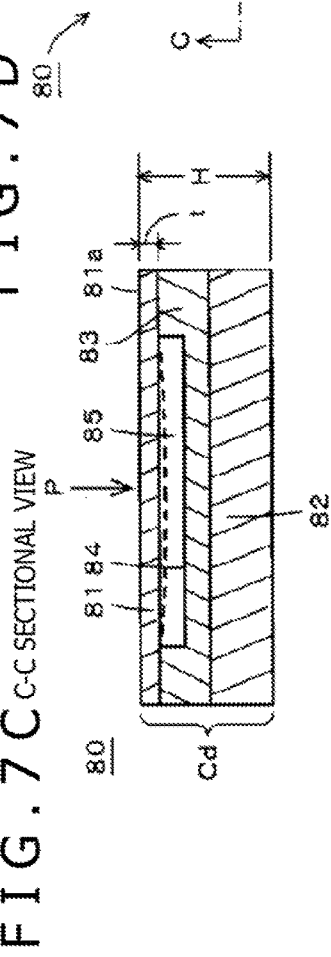
FIG. 7D FIG. 9A
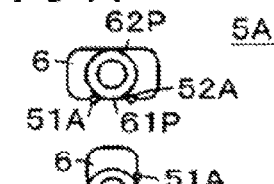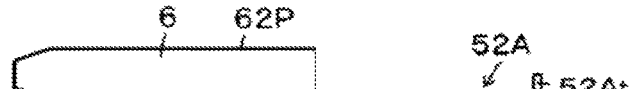
FIG. 9B
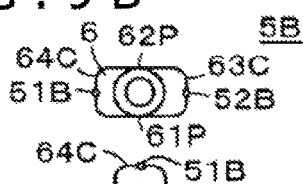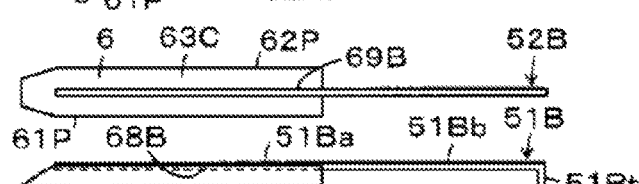
FIG. 9C
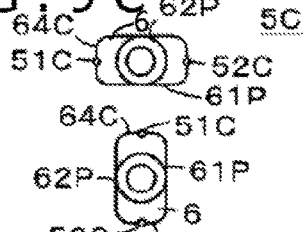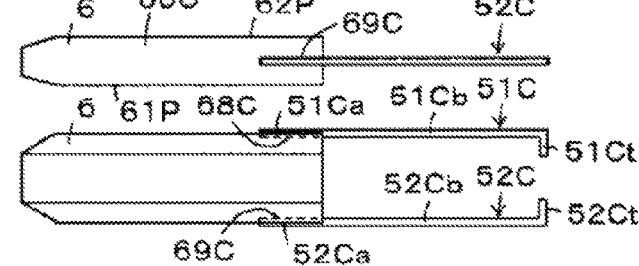
FIG. 9D
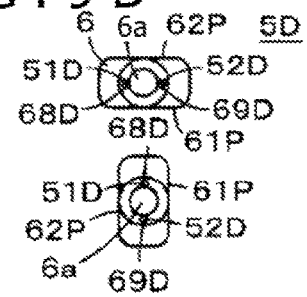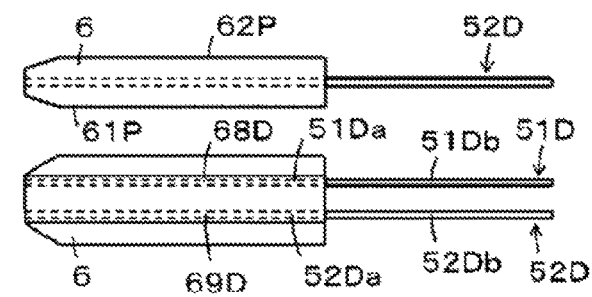
FIG. 9E
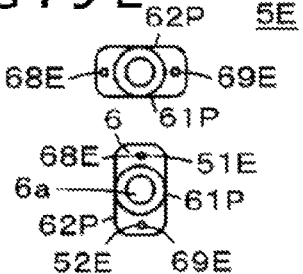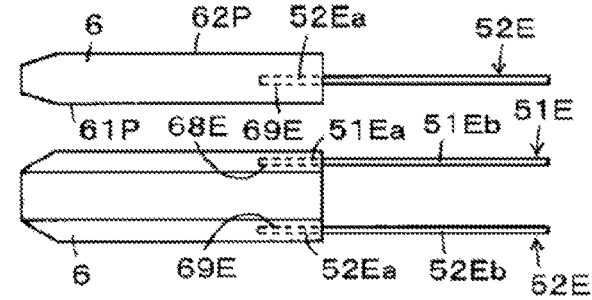

F I G . 1 2 (Prior Art)
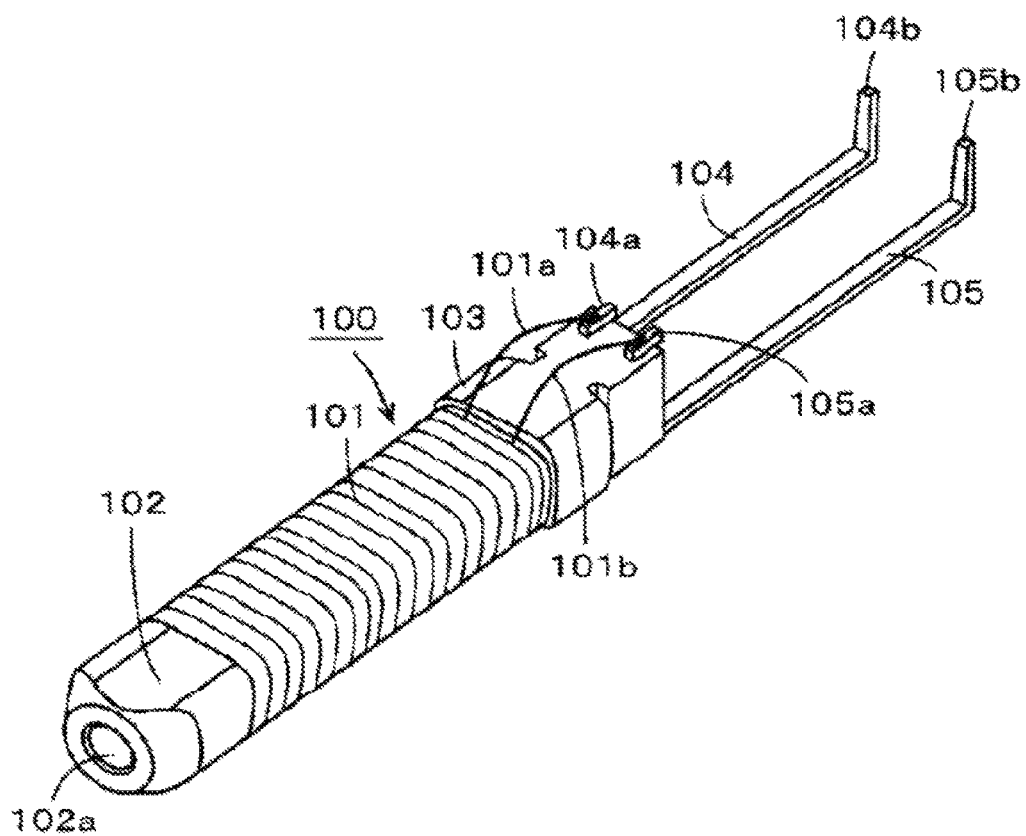

MAGNETIC CORE COIL AND ELECTRONIC PEN

BACKGROUND

Technical Field

The present disclosure relates to a magnetic core coil suitable when used in an electronic pen which is used together with a position detecting device, and an electronic pen using the magnetic core coil.

Background Art

An electronic pen of an electromagnetic induction type is provided with a coil for electromagnetic coupling with an electrode conductor of a sensor of a position detecting device of an electromagnetic induction type. In general, the coil has a configuration of a magnetic core coil wound around a magnetic material core such as a ferrite core. Besides, the electronic pen of the electromagnetic induction type is provided with an electronic circuit for performing transmission or reception of electromagnetic energy between itself and the sensor of the position detecting device, thereby to perform transmission or reception of a signal, and it is necessary to connect the magnetic core coil to the electronic circuit.

The magnetic core coil and a circuit board formed with the electronic circuit are disposed in a tubular casing of the electronic pen, in the state of being aligned in the axial direction. The magnetic core coil is disposed on the pen tip side of the electronic pen and in the vicinity of the tip, at a position as close as possible to the sensor of the position detecting device, in consideration of easy electromagnetic coupling of the magnetic core coil with the sensor. The circuit board of the electronic circuit is disposed behind the magnetic core coil, as viewed from the pen tip side of the electronic pen.

In the past, the coil has been electrically connected to the electronic circuit of the circuit board by a method in which both end portions of a winding starting end and a winding ending end of the coil are soldered directly to the circuit board. In this case, for the magnetic core coil used in the electronic pen, in general, a thin litz wire of, for example, 0.2 mm in diameter is used as the wire material. Since it is difficult for the thin litz wire to keep a predetermined form, soldering of the litz wire to a predetermined place of the circuit board has required considerable skill.

In view of this, a configuration in which a magnetic core coil in an electronic pen is provided with metal terminals to thereby eliminate the need for soldering using litz wire and to facilitate electrical connection of the magnetic core coil to a circuit board has been disclosed in, for example, Patent Document 1 (Japanese Patent Laid-Open No. 2014-150123), Patent Document 2 (Japanese Patent Laid-Open No. 2015-32167) and the like.

FIG. 12 is a figure depicting a configuration example of a magnetic core coil disclosed in Patent Document 2. As illustrated in FIG. 12, in a magnetic core coil 100 in this example, a coil 101 is wound around a ferrite core 102 as an example of a magnetic material core, a terminal leading-out member 103 made of a resin, for example, is connected to one end, in the axial direction orthogonal to the winding cross section of the coil 101, of the ferrite core 102, and a pair of metal terminal pieces 104 and 105 are provided for the terminal leading-out member 103.

In the example of FIG. 12, the ferrite core 102 is provided in a center position thereof with a through-hole 102a along the axial direction, and has a rod-like (columnar) shape with a flat cross-sectional shape. Though not illustrated, a core body main body portion exclusive of a tip portion (constituting a pen tip) of a core body of the electronic pen is inserted and passed in the through-hole 102a. The terminal leading-out member 103 is provided on the opposite side of the ferrite core 102 from the tip portion of the core body, and is used for connection to a circuit board on which an electronic circuit is formed. The ferrite core 102 is fitted in a recess provided in the terminal leading-out member 103, and is adhered to the latter with an adhesive, thereby being joined to the terminal leading-out member 103.

The metal terminal pieces 104 and 105 are fixed on one end in the terminal leading-out member 103 by resin molding, and have tips 104a and 105a at one thereof protruding and exposed to the outside of the terminal leading-out member 103, as depicted in FIG. 12. In addition, one end 101a of the coil 101 wound around the ferrite core 102 is connected to the tip 104a of the one-side end of the metal terminal piece 104, while the other end 101b of the coil 101 is connected to the tip 105a of the one-side end of the metal terminal piece 105, by soldering, for example.

On the other end, the metal terminal pieces 104 and 105 are led out to extend from the terminal leading-out member 103 in the axial direction of the ferrite core 102 toward the side opposite to the ferrite core side, as depicted in FIG. 12.

As illustrated in FIG. 12, tip portions on the other end of the metal terminal pieces 104 and 105 are bent portions 104b and 105b which are bent into directions orthogonal to the axial direction, toward the side of the circuit board of the electronic circuit. On the other hand, the circuit board is formed with through-holes at positions corresponding to the bent portions 104b and 105b on the other end of the metal terminal pieces 104 and 105. The bent portions 104b and 105b on the other end of the metal terminal pieces 104 and 105 are inserted into the through-holes of the circuit board and soldered to the latter, whereby the magnetic core coil 100 is electrically connected to the electronic circuit of the circuit board.

The magnetic core coil 100 in the example of FIG. 12 is produced by a method in which, first, the ferrite core 102 is fixed to the terminal leading-out member 103, and then a wire material is wound by rotating the ferrite core 102 together with the terminal leading-out member 103, thereby winding the coil 101 around the ferrite core 102. Thereafter, one end (for example, the winding starting end) 101a and the other end (for example, the winding ending end) 101b of the coil 101 are soldered respectively to the tip 104a of one-side end of the metal terminal piece 104 and the tip 105a of one-side end of the metal terminal piece 105.

According to the magnetic core coil 100 in the example of FIG. 12, mounting of the magnetic core coil 100 to the circuit board is remarkably facilitated, as compared to the case where the terminal leading-out member 103 and the metal terminal pieces 104 and 105 are not used.

PRIOR ART DOCUMENTS

Patent Documents

Patent Document 1: Japanese Patent Laid-Open No. 2014-150123

Patent Document 2: Japanese Patent Laid-Open No. 2015-32167

BRIEF SUMMARY

Technical Problems

Meanwhile, in recent years, in view of portable terminals for which position detecting devices are applied as input devices, further reductions in size and thickness are considered as a main stream. Therefore, with respect to electronic pens to be used together with position detecting devices, also, reductions in size and thickness (radial size) are demanded.

However, in the case where the magnetic core coil 100 provided with the metal terminal pieces 104 and 105 through the terminal leading-out member 103 as aforementioned is used for an electronic pen, the electronic pen would be increased in size, and be raised in cost, by an extent according to the terminal leading-out member 103.

Specifically, the configuration in which the ferrite core 102 is fitted in a recess provide in the terminal leading-out member 103 and adhered to the latter with an adhesive results in that the external shape in the direction orthogonal to the axial direction of the terminal leading-out member 103 is greater than the external shape in the direction orthogonal to the axial direction of the ferrite core 102. In addition, the tips 104a and 105a on one end of the metal terminal pieces 104 and 105 are designed to protrude from the terminal leading-out member 103 in the direction orthogonal to the axial direction, for connection of one end and the other end of the coil 101, so that the tips 104a and 105a on one end of the metal terminal pieces 104 and 105 are also hampering reductions in the size and thickness (radial size) of the magnetic core coil 100.

Further, in producing the magnetic core coil 100, it is necessary to fix the ferrite core 102 to the terminal leading-out member 103 configured to be equipped with the metal terminal pieces 104 and 105, which leads to a surplus of production steps and an unwanted increase in cost.

It is an object of the present disclosure to provide a magnetic core coil and an electronic pen by which one or more of the above-mentioned problems are solved.

Technical Solution

In order to solve one or more of the above-mentioned problems, a magnetic core coil according to the present disclosure has a core formed of a magnetic material, a coil wound around the core, and two terminals formed of a conductive material. The two terminals are fixed to the core, and first portions of the terminals protrude from one end of the core in an axial direction of the core, and a first end and a second end of the coil are electrically connected to the first portions of the two terminals which protrude from the one end of the core in the axial direction of the core.

In addition, an electronic pen according to the present disclosure includes a core formed of a magnetic material, a coil wound around the core, a pressure detector, a circuit board, and two terminals which are disposed in a tubular casing along an axial direction of the casing. The two terminals are fixed to the core, and first portions of the terminals protrude from one end of the core on a circuit board side of the core in the axial direction of the casing. A first end and a second end of the coil are electrically connected to first portions of the two terminals which protrude from the one end of the core in the axial direction of the casing. Ends of the first portions of the two terminals are connected to the circuit board and form a resonance circuit with a capacitor formed on the circuit board. The pressure detector, in operation, detects a pressure exerted on a tip of a core body which protrudes from an opening of the tubular casing.

In the magnetic core coil according to the present disclosure configured as aforementioned, the two terminals are fixed to the core formed of a magnetic material in a state in which the two terminals protrude from one end of the core in an axial direction of the core. In other words, the two terminals are fixed to the core directly, without any terminal leading-out member interposed therebetween. In addition, the first end and the second end of the coil are electrically connected to the first portions of the two terminals which protrude in the axial direction from the one end of the core. Besides, the first portions of the two terminals extended in the axial direction from the one end of the core are connected to a circuit board, thereby being connected to an electronic circuit formed on the circuit board.

Since the magnetic core coil according to the present disclosure has the two terminals connected directly to the core, the external shape of the magnetic core coil in the direction orthogonal to the axial direction of the core can be made substantially equal to the outside diameter of the core. In addition, since the first end and the second end of the coil are electrically connected to the first portions of the two terminals which protrude from the one end of the core in the axial direction of the core, the parts of the connection points also do not protrude in the direction orthogonal to the axial direction of the core; in this point, also, the external shape of the magnetic core coil in the direction orthogonal to the axial direction of the core can be made to be substantially equal to the outside diameter of the core.

Therefore, the external shape of the magnetic core coil in the direction orthogonal to the axial direction of the core can be made to be equal to and as thin as the outside diameter of the core. Further, since the terminal leading-out member described in related art example can be omitted, the magnetic core coil can be reduced also in the length (size) in the axial direction.

Moreover, since the coil is connected directly to the two terminals without using any terminal leading-out member, the number of production steps is reduced, and the magnetic core coil can be produced at low cost.

Besides, in the disclosure of the electronic pen, the magnetic core coil is reduced in thickness (radial size) and size, which contributes to reductions in the thickness (radial size) and size of the electronic pen itself.

Advantageous Effects

The magnetic core coil according to the present disclosure can be made small in thickness (radial size) and size and can be produced in a reduced number of production steps and at low cost.

In addition, according to the electronic pen of the present disclosure, the magnetic core coil is made to be small in thickness (radial size) and size, and, therefore, the electronic pen itself can also be made small in thickness (radial size) and size.

BRIEF DESCRIPTION OF THE DRAWINGS

FIGS. 2A, 2B, 2C, 2D, 2E, and 2F depict figures for explaining a configuration example of a ferrite core used in a magnetic core coil according an embodiment of to the present disclosure.

FIGS. 7A, 7B, 7C, and 7D depict figures for explaining an example of part of a pen pressure detection module used in the electronic pen according an embodiment of to the present disclosure.

FIGS. 9A, 9B, 9C, 9D, and 9E depict figures for explaining a configuration example of a ferrite core and terminals in the magnetic core coil according to an embodiment of the present disclosure.

FIG. 12 is a figure depicting an example of a conventional magnetic core coil used in an electronic pen.

DETAILED DESCRIPTION

Figure 1A:
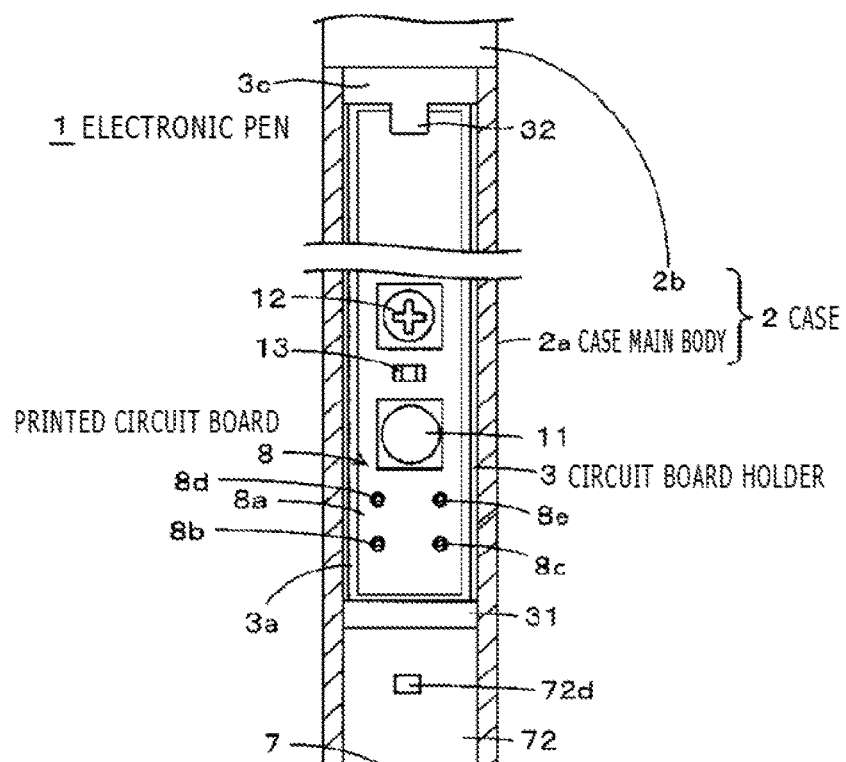
FIGS. 1A and 1B depict figures for explaining a configuration example an electronic pen according to an embodiment of the present disclosure.

An embodiment of a magnetic core coil according to the present disclosure and an embodiment of an electronic pen according to the present disclosure will be described below, referring to the drawings.

Figure 1B:
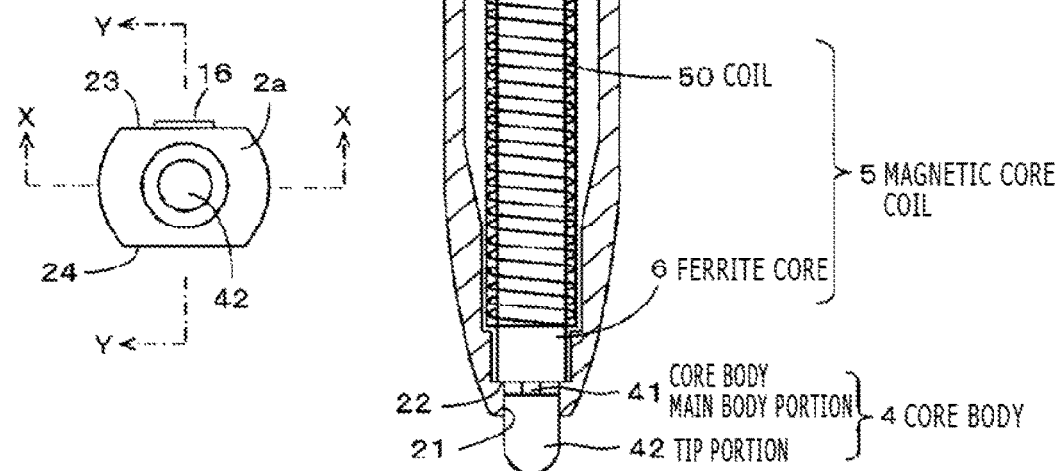

FIGS. 1A and 1B depict figures for explaining a configuration example of the embodiment of an electronic pen according to the present disclosure, and depicts schematically the whole part of an electronic pen 1 of the present embodiment. FIG. 1A depicts the inside of the electronic pen 1, by breaking only a case main body 2a of a case 2 (casing) of the electronic pen 1, for explanation. In addition, FIG. 1B is a view of the electronic pen 1 of the present embodiment, as viewed in an axial direction from the side of a core body 4.

As depicted in FIG. 1A, the electronic pen 1 has the case 2 constituting a bottomed tubular casing which is elongated in the axial direction, and has an opening on one side in the axial direction and is closed on the other side in the axial direction. The case 2 is formed, for example, of a resin or the like, and is constituted of a tubular case main body 2a having a cavity therein, and a case cap 2b coupled to the case main body 2a.

In the present embodiment, an external shape in a direction orthogonal to the center axis of the case main body 2a (equal to a profile of cross section of the case main body 2a) is a flat shape, as depicted in FIG. 1B. The external shape in the direction orthogonal to the center axis of the case main body 2a has two flat surfaces 23 and 24 which are parallel to each other, with the center axis therebetween, as depicted in FIG. 1B. A cavity inside the case main body 2a also has a cross-sectional shape which is a flat shape according to the external shape of the case main body 2a.

In the cavity of the case main body 2a, a core body 4 and a magnetic core coil 5 are accommodated in the state of being connected to a circuit board holder 3 through a pen pressure detection module 7. The magnetic core coil 5 is configured by winding a coil 50 around a magnetic material core, in this example, a ferrite core 6, and has terminals as will be described later.

The core body 4 includes a core body main body portion 41 composed of a comparatively thin rod-shaped body, and a tip portion 42 formed on one end in the axial direction of the core body main body portion 41. The tip portion 42 of the core body 4 is exposed by protruding to the outside through an opening 21 formed at one end in the axial direction of the case main body 2a, a pen tip being formed at the one end. The outside diameter of the tip portion 42 of the core body 4 is, for example, 1 to 2 mm, and the core body main body portion 41 is a cylindrical rod-shaped body smaller than the tip portion 42 in diameter.

[Embodiment of Magnetic Core Coil 5]

FIGS. 2A, 2B, 2C, 2D, 2E, and 2F depict a configuration example of the ferrite core 6 used for the magnetic core coil 5 of the electronic pen 1 in the present embodiment. The ferrite core 6, in this example, has a columnar shape provided therein with a through-hole 6a having a diameter R1 slightly greater than a diameter R0 of the core body main body portion 41 of the core body 4, for inserting and passing the core body main body portion 41 through the through-hole 6a. In the present embodiment, the ferrite core 6 has a flat cross-sectional shape corresponding to the cross-sectional shape of the cavity in the case main body 2a.

FIG. 2A is a perspective view of the ferrite core 6 in this example. In addition, FIG. 2B is a top view depicting a state in which the ferrite core 6 in this example is accommodated in the case main body 2a, as viewed in a direction orthogonal to the two flat surfaces 23 and 24 of the external shape of the case main body 2a. Besides, FIG. 2C is a side view depicting a state in which the ferrite core 6 in this example is accommodated in the case main body 2a, as viewed in a direction parallel to the two flat surfaces 23 and 24 of the external shape of the case main body 2a. In addition, FIG. 2D is a view of the ferrite core 6 in this example, as viewed from the core body 4 side in the axial direction. Further, FIG. 2E is a sectional view (longitudinal sectional view of the ferrite core 6) taken along line A-A of FIG. 2B, and FIG. 2F is a sectional view (cross-sectional view of the ferrite core 6) taken along line B-B of FIG. 2C.

In the present embodiment, the ferrite core 6 has a columnar configuration, and has the through-hole 6a with the diameter R1 in a center axis position thereof. The external shape of the ferrite core 6 in a direction orthogonal to the center axis is a flat shape according to the profile of the cross section of the case main body 2a, as depicted in FIG. 2D.

The columnar ferrite core 6 has a shape which is provided at side surface portions with flat surfaces 61P and 62P parallel to each other with the center axis therebetween, and in which the two parallel flat surfaces 61P and 62P are connected by curved surfaces 63C and 64C. The presence of the curved surfaces 63C and 64C ensures that notwithstanding the ferrite core 6 has the flat shape, the coil 50 can be wound in close contact with the outer surface of the ferrite core 6.

In the present embodiment, that end portion in the axial direction of the ferrite core 6 which is on the side of the tip portion 42 of the core body 4 when the core body 4 is inserted and passed through the through-hole 6a is formed with a tapered portion 65 tapered toward the side of the tip portion 42 of the core body 4.

In the case where the ferrite core has a flat shape, an end face of the ferrite core may spread transversely, and it may be difficult to concentrate a magnetic flux into the tip portion 42 of the core body 4, as compared to the case where the end face is truly circular as in related art. In the case of the ferrite core 6 in this example, however, the end portion on the tip portion 42 side of the core body 4 has the tapered portion 65, and the tapered portion 65 is configured such as to be terminated with an annular flat surface 67; therefore, the magnetic flux can be concentrated into the annular flat surface 67 and, hence, the magnetic flux can be concentrated into the tip portion 42 of the core body 4.

In the present embodiment, one of the flat surfaces 61P and 62P of the ferrite core 6, in this example, the flat surface 61P, is formed with two grooves 68 and 69 parallel to each other and along the axial direction of the ferrite core 6. In the present embodiment, the two grooves 68 and 69 are formed to extend over the whole length in the axial direction of the ferrite core 6, as depicted in FIGS. 2A and 2B.

Figure 3A:
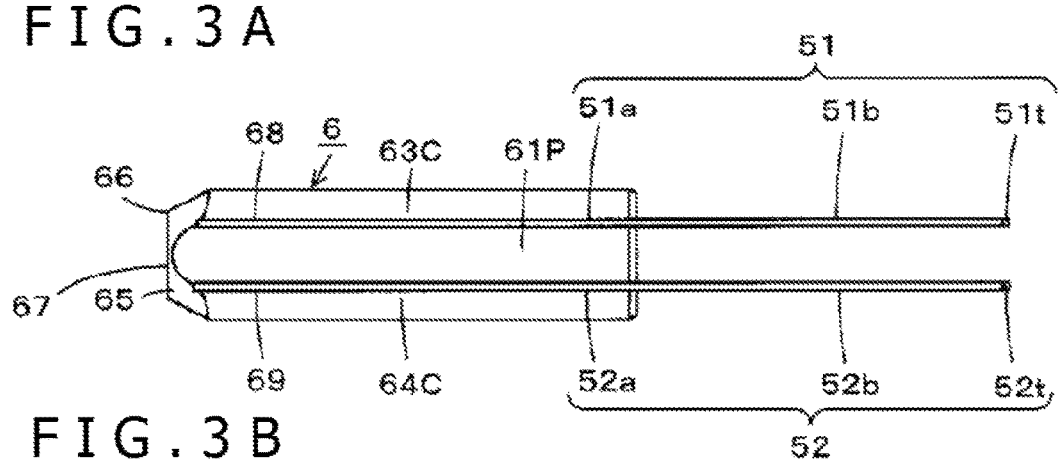
FIGS. 3A and 3B depict figures for explaining a configuration example of a connected state of a ferrite core and terminals used in the magnetic core coil according to an embodiment of the present disclosure.
Figure 3B:
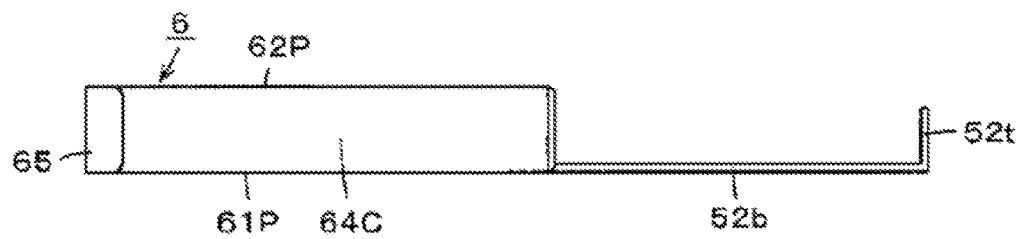

As depicted in FIGS. 3A and 3B, two terminals 51 and 52 are fitted in the two grooves 68 and 69. The two grooves 68 and 69 are an example of thin linear recesses for fitting the two terminals 51 and 52 therein, and their cross-sectional shape (groove shape) may be any of various shapes such as an arcuate shape, a V shape, and a U shape. The two terminals 51 and 52 are rectilinear members composed of thin bar-shaped members or thin plate-shaped members formed of a conductive material, for example, a conductive metal. The terminals 51 and 52 are each configured as an integral body of a conductive metal; in this example, for convenience of explanation, the terminals 51 and 52 have core connecting portions 51a and 52a, extension portions 51b and 52b, and bent portions 51t and 52t, as part names.

As illustrated in FIG. 3B, the terminals 51 and 52 have their core connecting portions 51a and 52a fitted in the grooves 68 and 69 of the ferrite core 6, and joined to the ferrite core 6 by adhesion with an adhesive, for example. The extension portions 51b and 52b of the terminals 51 and 52 extend in the axial direction from that end portion of the ferrite core 6 at which the tapered portion 65 is not formed. Further, tips of the extension portions 51b and 52b of the terminals 51 and 52 are bent at a predetermined angle, for example, at a right angle, to the side of an extension surface of the flat surface 62P of the ferrite core 6, whereby bent portions 51t and 52t are formed. Tips of the bent portions 51t and 52t serve as end portions for connection with an electronic circuit of the printed circuit board as will be described later.

Figure 4A:
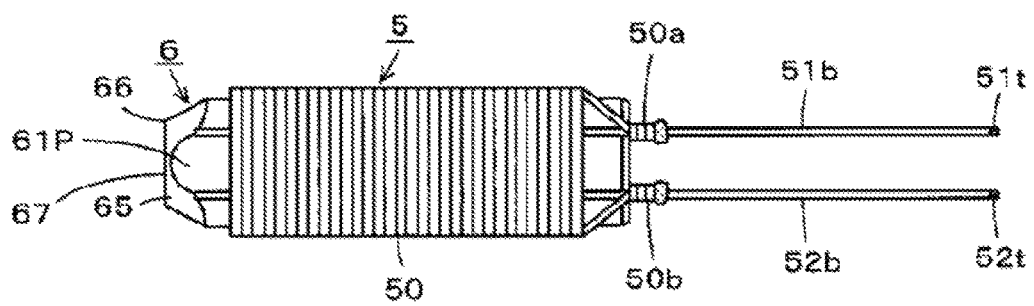
FIGS. 4A and 4B depict figures for explaining a configuration example of the magnetic core coil according to an embodiment of the present disclosure.
Figure 4B:
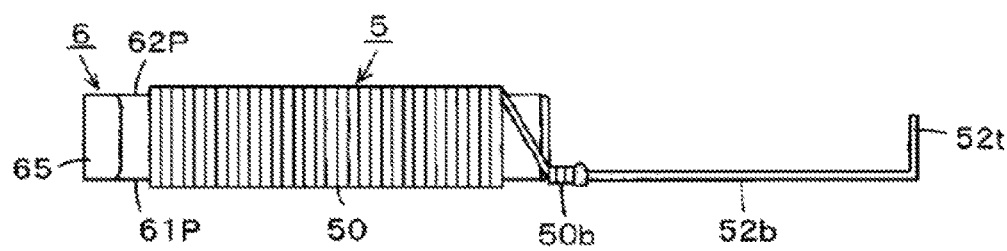

In a state in which the terminals 51 and 52 are connected to the ferrite core 6 in the above-mentioned manner, a litz wire, for example, is wound around the ferrite core 6 to form the coil 50, as depicted in FIGS. 4A and 4B. Therefore, the terminals 51 and 52 are not only fitted in the grooves 68 and 69 of the ferrite core 6 and adhered to the ferrite core 6 but also joined to the ferrite core 6 in the manner of being bound to the ferrite core 6 by the wound portion of the coil 50; accordingly, the terminals 51 and 52 are firmly fixed to the ferrite core 6.

In this case, in this example, as illustrated in FIGS. 4A and 4B, a winding starting end 50a of the coil 50 is wound multiple times around that part of the extension portion 51b of the terminal member 51 protruding in the axial direction from an end portion of the ferrite core 6 which is in the vicinity of the end portion of the ferrite core 6, and the winding starting end 50a is soldered to the extension portion 51b of the terminal member 51. Similarly, a winding ending end 50b of the coil 50 is wound multiple times around that part of the extension portion 52b of the terminal member 52 protruding in the axial direction from the end portion of the ferrite core 6 which is in the vicinity of the end portion of the ferrite core 6, and the winding ending end 50b is soldered to the extension portion 52b of the terminal member 52. In this way, the magnetic core coil 5 is manufactured.

As a method for winding the coil 50 around the ferrite core 6, there may be mentioned two methods, namely, a method in which the ferrite core 6 side is fixed and the coil 50 is wound around the ferrite core 6, and a method in which the coil 50 is wound around the ferrite core 6 by rotating the ferrite core 6 side, and either of the two methods may be used. In either case, a step of winding the coil 50 around the ferrite core 6, inclusive of steps of winding the winding starting end 50a and the winding ending end 50b of the coil 50 around the extension portions 51b and 52b of the terminals 51 and 52, can be carried out using an automatic machine.

For instance, in the case of the method in which the ferrite core 6 side is fixed and the coil 50 is wound around the ferrite core 6, a delivery nozzle for a litz wire for constituting the coil 50 is rotated about the extension portion 51b of the terminal member 51, whereby the winding starting end 50a of the coil 50 is wound around the extension portion 51b, after which the litz wire delivery nozzle is rotated about the ferrite core 6 to wind the coil 50 around the ferrite coil 6, and thereafter the litz wire delivery nozzle is rotated about the extension portion 52b of the terminal member 52, whereby the winding starting end 50a of the coil 50 is wound around the extension portion 52b.

In addition, in the case where the ferrite core 6 side is rotated, first, the ferrite core 6 is rotated with the extension direction position of the terminal member 51 as a rotational axis position, whereby the litz wire is wound around the extension portion 51b of the terminal member 51 as the winding starting end 50a of the coil 50. Next, the ferrite core 6 is rotated with the center line position of the ferrite core 6 as the rotational axis position, to wind the litz wire around the ferrite core 6. Then, when the winding of the coil 50 around the ferrite core 6 is finished, the ferrite core 6 is rotated with the extension direction position of the terminal member 52 as the rotational axis position, to wind the litz wire around the extension portion 52b of the terminal member 52 as the winding ending end 50b of the coil 50.

Then, the winding starting end 50a of the coil 50 wound around the extension portion 51b of the terminal member 51 and the winding ending end 50b of the coil 50 wound around the extension portion 52b of the terminal member 52 are soldered to the terminal member 51 and the terminal member 52, respectively, to be thereby electrically connected to the terminals 51 and 52.

Figure 5A:
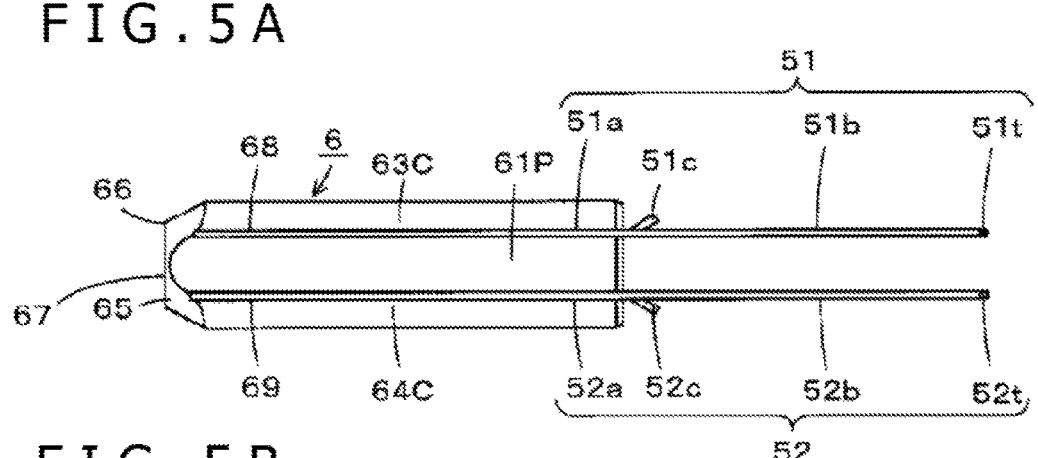
FIGS. 5A, 5B, and 5C depict figures for explaining a configuration example of a ferrite core and terminals in the magnetic core coil according an embodiment of to the present disclosure.
Figure 5B:
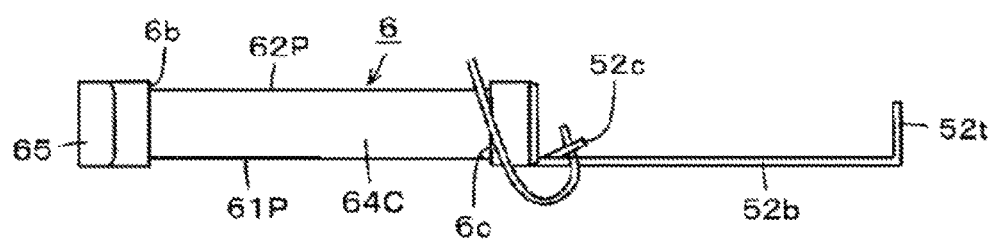

Note that as illustrated in FIG. 5B, the extension portions 51b and 52b of the terminals 51 and 52 may be formed, at positions in the vicinity of the end portion of the ferrite core 6, with projections 51c and 52c such as to form wedge shapes (V-shaped grooves) between themselves and the extension portions 51b and 52b. According to such a configuration, when the litz wire for constituting the coil 50 is engaged with the wedge shapes (V-shaped grooves) between the projections 51c and 52c and the extension portions 51b and 52b, the litz wire can be easily locked to the terminals 51 and 52.

In addition, as depicted in FIGS. 5A and 5B, that portion of the ferrite core 6 around which the coil 50 is wound may be set lower in height than other portions such that stepped portions 6b and 6c are formed at both ends of the portion around which the coil 50 is wound. This ensures that the litz wire to be wound around the ferrite core 6 as the coil 50 can be easily wound in a well aligned manner, with the stepped portions 6b and 6c as guides.

Figure 5C:
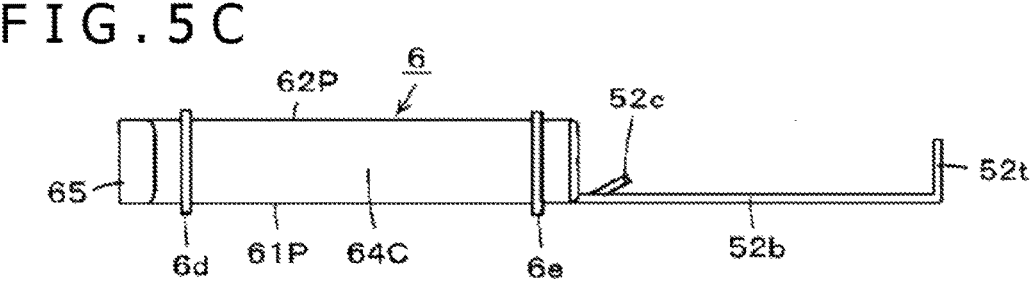

Note that as depicted in FIG. 5C, in place of the stepped portions 6b and 6c, and at the positions of the stepped portions 6b and 6c, the ferrite core 6 may be formed with thin annular projections 6d and 6e having a height comparable to the thickness of the litz wire of the coil 50.

Note that the terminals 51 and 52 can be easily fitted into the ferrite core 6, as follows. Specifically, two linear bodies of a conductive metal constituting the terminals 51 and 52 are laid on rails, with a spacing therebetween corresponding to the spacing between the two grooves 68 and 69 of the ferrite core 6. Then, a plurality of ferrite cores 6 are pressed from above the two linear bodies of the conductive metal, such as to fit the linear bodies of the conductive metal into the two grooves 68 and 69, at an interval set taking into account the extension portions 51b and 52b and the bent portions 51t and 52t, whereby the linear bodies of the conductive metal are gradually joined to the ferrite cores 6 individually. In this case, an adhesive is preliminarily applied to the grooves 68 and 69, and the terminal portions 51 and 52 are attached to the grooves 68 and 69. Then, the two linear bodies of the conductive metal are cut at intervals set taking into account the lengths in the axial direction of the ferrite core 6, the extension portions 51b and 52b, and the bent portions 51t and 52t.

Thereafter, as above-mentioned, the coil 50 is wound around the ferrite core 6, both ends of the coil 50 are soldered to the terminals 51 and 52, and thereafter the bent portions 51t and 52t are formed. Note that, naturally, the bent portions 51t and 52t may be formed before winding the coil 50 around the ferrite core 6.

The magnetic core coil 5 configured as above-mentioned mentioned above is provided on the most opening 21 side in the cavity of the case main body 2a of the electronic pen 1, as depicted in FIG. 1A. In addition, as depicted in FIG. 1A, in the cavity of the case main body 2a of the electronic pen 1, the circuit board holder 3 for holding the printed circuit board 8 is disposed on the opposite side of the magnetic core coil 5 from the opening 21, through the pen pressure detection module 7.

[Configuration in Case Main Body 2a of Electronic Pen 1]

Figure 6A:
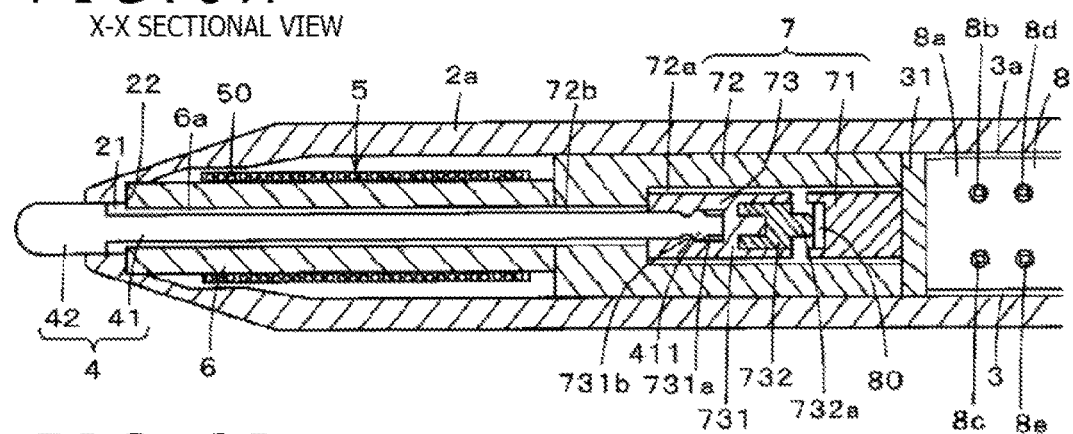
FIGS. 6A and 6B depict figures for explaining an inside configuration example of the electronic pen according to an embodiment of the present disclosure.
Figure 6B:
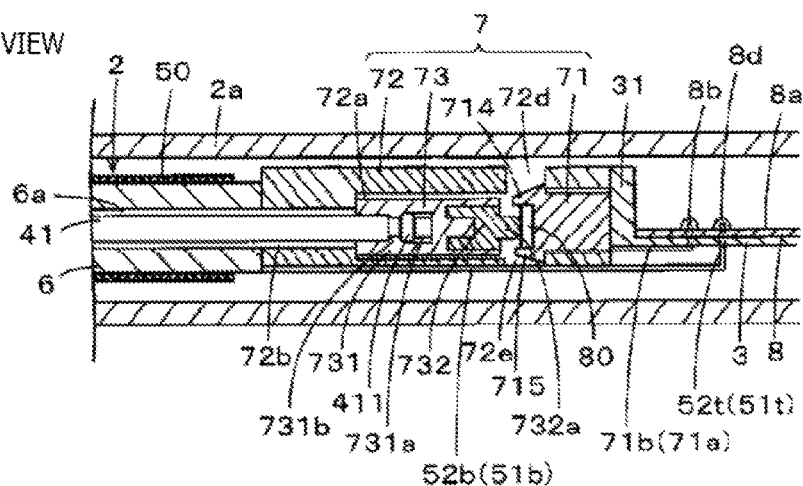

FIG. 6A is a sectional view taken along line X-X of FIG. 1B, and is a sectional view of part when the electronic pen 1 is cut in a direction which passes the axial center position of the electronic pen 1 and which is parallel to the two flat surfaces 23 and 24 (see FIG. 1B) of the external shape of the case main body 2a. In addition, FIG. 6B is a sectional view taken along line Y-Y of FIG. 1B, and is a sectional view of part when the electronic pen 1 is cut in a direction which passes the axial center position of the electronic pen 1 and which is perpendicular to the two flat surfaces 23 and 24.

In this case, the cavity of the case main body 2a has a diameter greater than the diameter of the opening 21, and an inner wall surface constituting the cavity is formed with a stepped portion 22 on the opening 21 side. A tip side of the tapered portion 65 of the ferrite core 6 of the magnetic core coil 5 abuts on the stepped portion 22, such that the magnetic core coil 5 does not slip off from the cavity of the case main body 2a to the outside.

The core body 4 is inserted and passed through the through-hole 6a (see FIG. 2A) of the ferrite core 6 and engaged with the pen pressure detection module 7. In order that the core body 4 can transmit a pressure (pen pressure) exerted on the tip portion 42 to the pen pressure detection nodule 7, the core body 4 is formed of a rigid material, examples of which include polycarbonate, synthetic resin, and acrylonitrile-butadiene-styrene (ABS) resin.

The circuit board holder 3 is formed of a resin, for example, and is provided with a printed circuit board mount base portion 3a in a longitudinal direction which coincides with the axial direction of the electronic pen 1 when accommodated in the cavity of the case main body 2a. The printed circuit board 8 is mounted on the printed circuit board mount base portion 3a of the circuit board holder 3. The printed circuit board 8 has an elongated rectangular shape having a width narrower than the inside diameter of the case main body 2a and a predetermined length in the longitudinal direction. The length in the longitudinal direction of a circuit board mount surface of the printed circuit board mount base portion 3a is substantially equal to or slightly greater than the length in the longitudinal direction of the printed circuit board 8. In addition, the length in the transverse direction of the circuit board mount surface of the printed circuit board mount base portion 3a is selected to be slightly larger than the width of the printed circuit board 8.

The printed circuit board 8 is provided with a push switch (side switch) 11 which is turned ON when depressed and returns to be OFF when the depression is stopped. The printed circuit board 8 is provided also with capacitors 12 and 13 which constitute a resonance circuit together with an inductance element composed of the coil 50 wound around the ferrite core 6. In this example, the capacitor 12 is a trimmer capacitor of which capacitance can be regulated. Further, the printed circuit board 8 is formed with other circuit component parts and conductor patterns which are not depicted in the drawings. Note that to the resonance circuit, a capacitance Cd constituted of a semiconductor chip 80 of the pen pressure detection module 7 to be described later is also connected, in parallel to the inductance element.

Besides, in this example, a side circumferential surface of the case main body 2a of the electronic pen 1 is formed with a through-hole (omitted in the drawing) at a position corresponding to the side switch 11, and a depression operating piece 16 (see FIG. 1B) for the side switch 11 is exposed such that the side switch 11 can be thereby depressed through the through-hole. In this case, a predetermined function is allocated and set, on the side of an electronic apparatus provided with a position detecting device 200 described later, to the depressing operation of the side switch 11 by the depression operating piece 16. For example, in the electronic apparatus in this example, the depressing operation of the side switch 11 by the depression operating piece 16 can be set to be allocated as an operation equivalent to a click operation of a pointing device such as a mouse.

In this example, the capacitors 12 and 13 constituting part of the resonance circuit are disposed in the printed circuit board 8 as chip parts. In the present embodiment, the capacitance of the trimmer capacitor 12 is regulated, whereby the resonance frequency of the resonance circuit is controlled.

In the case of this example, a wall portion 31 arranged in a direction orthogonal to the printed circuit board mount base portion 3a of the printed circuit holder 3 is formed at an end portion on the core body 4 side in the longitudinal direction of the printed circuit board mount base portion 3a. The circuit board holder 3 has the part of the wall portion 31 as one end in the longitudinal direction, and a surface on the core body 4 side of the wall portion 31 is a flat surface.

In addition, as depicted in FIG. 1A, a locking portion 32 by which an end portion in the longitudinal direction of the printed circuit board 8 is locked to the printed circuit board mount base portion 3a of the circuit board holder 3 by clamping the printed circuit board 8 in the thickness direction is formed at that end portion in the longitudinal direction of the printed circuit board mount base portion 3a which is on the side opposite to the core body 4 side.

Besides, in the axial direction of the cavity of the case main body 2a, the pen pressure detection module 7 is provided between the wall portion 31 of the circuit board holder 3 and the ferrite core 6 around which the coil 50 is wound. In this case, as will be described later, that end face of the pen pressure detection module 7 which is on the side opposite to the core body 4 side is a flat surface, and is in the state of abutment on the surface of the wall portion 31 of the circuit board holder 3.

Besides, metal terminal pieces 71a and 71b (see FIG. 6B and FIGS. 7A and B described later) led out in the axial direction from a pressure sensing device 71 held by the pen pressure detection module 7 are soldered at soldered portions 8b and 8c, in the vicinity of the wall portion 31 on the core body 4 side in the longitudinal direction of the printed circuit board mount base portion 3a of the circuit board holder 3, whereby the pen pressure detection module 7 is fixed to the circuit board holder 3.

In this case, as depicted in FIG. 6B and FIGS. 7A and 7B described later, the metal terminal pieces 71a and 71b are led out from the pressure sensing device 71 in the axial direction of the cavity of the case main body 2a, and tip sides thereof are bent toward the printed circuit board 8 in a direction orthogonal to the axial direction. Besides, through-holes are formed at positions of the soldered portions 8b and 8c of the printed circuit board 8, and the printed circuit board mount base portion 3a of the circuit board holder 3 is formed with through-holes at the corresponding positions. Further, the bent portions of the tip portions of the metal terminal pieces 71a and 71b of the pen pressure detection module 7 are inserted through the through-holes in the printed circuit board mount base portion 3a and the through-holes in the printed circuit board 8, from the back side of the printed circuit board mount base portion 3a, to protrude to the circuit board surface 8a side of the printed circuit board 8. The tip portions of the metal terminal pieces 71a and 71b thus protruding to the circuit board surface 8a side of the printed circuit board 8 are soldered, whereby the soldered portions 8b and 8c are formed.

By the soldered portions 8b and 8c, electrical connection between circuit component parts of the printed circuit board 8 and a pressure sensing portion of the pressure sensing device 71 is conducted. In addition, in a state in which the pen pressure detection module 7 holding the pressure sensing device 71 is in abutment on the wall portion 31 of the circuit board holder 3, soldering at the soldered portions 8b and 8c is conducted, whereby the pen pressure detection module 7 is fixed to the circuit board holder 3.

In the cavity of the case main body 2a of the electronic pen 1, the side of the pen pressure detection module 7 opposite to its portion of connection with the circuit board holder 3 is in abutment on the end face side where the terminals 51 and 52 of the ferrite core 6 of the magnetic core coil 5 protrude in the axial direction. Part of the ferrite core 6 may be fitted to the pen pressure detection module 7.

In this case, the two terminals 51 and 52 connected to the ferrite core 6 in such a manner as to protrude and extend in the axial direction from that end face of the ferrite core 6 which abuts on the pen pressure detection module 7 have the extension portions 51b and 52b extending along an outside surface of the pen pressure detection module 7 to the position of the printed circuit board 8 of the circuit board holder 3. Besides, the tips of the bent portions 51t and 52t of the terminals 51 and 52 are inserted into the through-holes formed in the printed circuit board 8, to protrude to the circuit board surface 8a side of the printed circuit board 8. The tip portions of the bent portions 51t and 52t of the terminals 51 and 52 protruding to the circuit board surface 8a side of the printed circuit board 8 are soldered, whereby soldered portions 8d and 8e are formed.

By the soldered portions 8d and 8e, the capacitors 12 and 13 of the printed circuit board 8 and the coil 50 of the magnetic core coil 5 are connected in parallel, whereby electrical connection such as to form a resonance circuit is performed; in addition, in a state in which the pen pressure detection module 7 is held between the magnetic core coil 5 and the circuit board holder 3, soldering is conducted at the soldered portions 8d and 8e, whereby the magnetic core coil 5 is fixed to the circuit board holder 3.

Note that as depicted in FIG. 1A, in a state in which the printed circuit board 8 is locked to the printed circuit board mount base portion 3a by the locking portion 32 and is fixed by the soldered portions 8b, 8c, 8d, and 8e, the printed circuit board 8 does not contact the inner wall surface of the case main body 2a but is spaced from the case main body 2a.

In addition, as depicted in FIG. 1A, in this example, the circuit board holder 3 is connected to a case cap 2b at a connection portion 3c at that end portion of the printed circuit board mount base portion 3a which is on the side opposite to the core body 4 side in the longitudinal direction, so that the case cap 2b and the circuit board holder 3 can be handled as an integral body.

Therefore, in this example, a structure in which the printed circuit board 8 is mounted on and fixed to the printed circuit board mount base portion 3a of the circuit board holder 3 and in which the pen pressure detection module 7 and the magnetic core coil 5 are fixed and held on the circuit board holder 3 can be handled as a single module part (referred to as pen module part). The pen module part is accommodated in the cavity of the case main body 2a, the core body 4 is inserted through the opening 21 of the case main body 2a, and the pen pressure detection module 7 is engaged through the through-hole 6a of the ferrite core 6 and a through-hole 9b of a terminal leading-out member 9, whereby the electronic pen 1 can be completed.

In this case, with the case cap 2b coupled to the case main body 2a, the circuit board holder 3 is locked within the cavity of the case body 2a in such a manner as not to move in the axial direction. With the pen pressure detection module 7 fixed to the circuit board holder 3, the pen pressure detection module 7 is also locked within the cavity of the case main body 2a in such a manner as not to move in the axial direction, and a pen pressure exerted on the core body 4 can be received.

Note that when the pen pressure detection module 7 and the magnetic core coil 5 are connected to the circuit board holder 3, the center line position in the axial direction of the pen pressure detection module 7 and the center line position in the axial direction of the magnetic core coil 5 coincide with each other. In addition, in a state in which the pen module part is accommodated in the cavity of the case main body 2*a*, the circuit board holder 3 is connected to the case cap 2*b* in such a manner that the center line position in the axial direction of the pen pressure detection module 7 and the center line position in the axial direction of the magnetic core coil 5 coincide with the center line position in the axial direction of the cavity of the case main body 2*a*.

[Configuration Example of Pen Pressure Detection Module 7]

Now, the configuration of the pen pressure detection module 7 in the present embodiment will be described referring to FIGS. 6A, 6B, 7A, and 7B.

As depicted in FIGS. 6A and 6B, the pen pressure detection module 7 includes the pressure sensing device 71, an outer holder 72 as a first holder, and an inner holder 73 as a second holder. The outer holder 72 is formed of a rigid resin, for example, polyoxymethylene (POM) (or polyacetal) resin or polycarbonate.

The outer holder 72 has a tubular shape, and accommodates in its cavity 72*a* the pressure sensing device 71 and the inner holder 73 in the state of being aligned in the axial direction. As depicted in FIGS. 6A and 6B, the inner holder 73 includes a locking member 731 as an example of a first member for locking the core body main body portion 41 of the core body 4 to the inner holder 73 by engaging with the core body main body portion 41, and a pressing member 732 as an example of a second member for transmitting the pressure exerted on the core body 4 to the pressure sensing device 71 by contacting the pressure sensing device 71 as will be described later.

The locking member 731 is formed, in the axial direction in a central portion on the core body main body portion 41 side in the axial direction thereof, with a recessed hole 731*a* into which the core body main body portion 41 is inserted. The recessed hole 731*a* has a cylindrical shape, and is formed at an inner wall surface thereof with an annular projection 731*b* projecting in an arcuate shape.

On the other hand, as depicted in FIGS. 6A and 6B, the core body main body portion 41 is formed, at a predetermined position of an end portion thereof and in a direction orthogonal to the axial direction thereof, with an annular projection 411 projecting in an arcuate shape, in this example.

Specifically, the core body main body portion 41 is inserted into the recessed hole 731*a* in the locking member 731 of the inner holder 73 through a through-hole 72*b* in the outer holder 72. When the annular projection 411 of the core body main body portion 41 comes over the annular projection 731*b* of the recessed hole 731*a*, an end face of the core body main body portion 41 abuts on a bottom portion of the recessed hole 731*a*. In a state in which the end face of the core body main body portion 41 and the bottom portion of the recessed hole 731*a* are in abutment on each other, the core body main body portion 41 is locked in the recessed hole 731*a* of the locking member 731 by the engagement between the annular projection 731*b* and the annular projection 411. In this case, the core body main body portion 41 is kept in the state of being locked in the recessed hole 731*a* of the locking member 731, unless the core body main body portion 41 is drawn out with a predetermined force.

In the next place, the pressing member 732 as an example of the second member of the inner holder 73 is composed of an elastic member, in the present embodiment.

The pressing member 732 is formed on that side of the locking member 731 which is for facing the pressure sensing device 71 in the axial direction, in the state of being connected to the locking member 731. The pressing member 732 is formed, at an end face in the axial direction thereof, with a projection in the shape of projecting from the end face, in this example, a small-diameter cylindrical projection 732*a*. In this instance, the end face of the cylindrical projection 732*a* of the pressing member 732 faces the pressure sensing device 71 side, and is in the state of being able to contact the pressure sensing device 71.

Now, the pressure sensing device 71 accommodated in a second accommodating space 722 of the outer holder 72 will be described below. FIGS. 7A, 7B, 7C, and 7D depict figures for explaining the pressure sensing device 71 in this example.

As depicted in FIG. 7A, the pressure sensing device 71 in the present embodiment includes the semiconductor chip 80 constituting a pressure sensing portion of a capacitance system, and a socket 710 which accommodates the semiconductor chip 80 therein and which is provided with the above-mentioned metal terminal pieces 71*a* and 71*b*. As depicted in FIG. 7B, the semiconductor chip 80 is accommodated in an accommodating recess 711 of the socket 710, whereby a first electrode 81 and a second electrode 82 which will be described later are individually connected to the metal terminal pieces 71*a* and 71*b*.

FIG. 7C depicts a cross section of the semiconductor chip 80. FIG. 7D is a plan view of the semiconductor chip 80, as viewed in a direction of exerting a pressure P depicted in FIG. 7C. FIG. 7C is a sectional view taken along line C-C of FIG. 7D.

The semiconductor chip 80 in this example is for detecting an exerted pressure as a variation in capacitance, and, in this example, it is configured as depicted in FIG. 7C. As depicted in FIG. 7D, the semiconductor chip 80 in this example has a rectangular parallelepiped shape having, for example, lengths L in the longitudinal and transverse direction of 1.5 mm and a height H of 0.5 mm. As depicted in FIG. 7C, the semiconductor chip 80 in this example includes the first electrode 81, the second electrode 82, and an insulating layer (dielectric layer) 83 between the first electrode 81 and the second electrode 82. In this example, the first electrode 81 and the second electrode 82 are formed of a conductor composed of single crystal silicon (Si).

Besides, the insulating layer 83 is formed, on the side of its surface facing the first electrode 81, with a recess 84 which has a circular shape with a central position of the surface as a center. Due to the recess 84, a space 85 is formed between the insulating layer 83 and the first electrode 81. Due to the presence of the space 85, the first electrode 81 can be displaced in the manner of bending toward the space 85 when pressed from the side of an upper surface 81*a* which is on the side opposite to its surface facing the second electrode 82.

In the semiconductor chip 80 as an example of a pressure sensing chip configured as above, a capacitance Cd is formed between the first electrode 81 and the second electrode 82. When a pressure is exerted on the first electrode 81 from the side of its upper surface 81*a* on the side opposite to its surface facing the second electrode 82 of the first electrode 81, the first electrode 81 is displaced in the manner of bending toward the space 85 side, whereby the spacing between the first electrode 81 and the second electrode 82 is shortened, and the capacitance Cd varies in the manner of increasing in value.

In the electronic pen 1 in the embodiment which is configured as above, when a pen pressure is exerted on the core body 4, the locking member 731 of the inner holder 73 in engagement with the core body main body portion 41 of the core body 4, in the pen pressure detection module 7, is displaced within the outer holder 72 toward the side of the semiconductor chip 80 of the pressure sensing device 71 in the axial direction according to the pen pressure exerted. Therefore, the pressing member 732 fitted to the locking member 731 causes the first electrode 81 of the semiconductor chip 80 of the pressure sensing device 71 to bend toward the second electrode 82 side through the space 85, whereby the capacitance Cd of the capacitor configured between the first electrode 81 and the second electrode 82 of the semiconductor chip 80 is varied according to the pen pressure. Due to the variation in the capacitance Cd, the resonance frequency of the resonance circuit of the electronic pen 1 is varied, and, by detecting the variation in the resonance frequency, the position detecting device detects the pen pressure exerted on the core body 4 of the electronic pen 1.

[Circuit Configuration for Position Detection and Pen Pressure Detection by Position Detecting Device]

Figure 8:
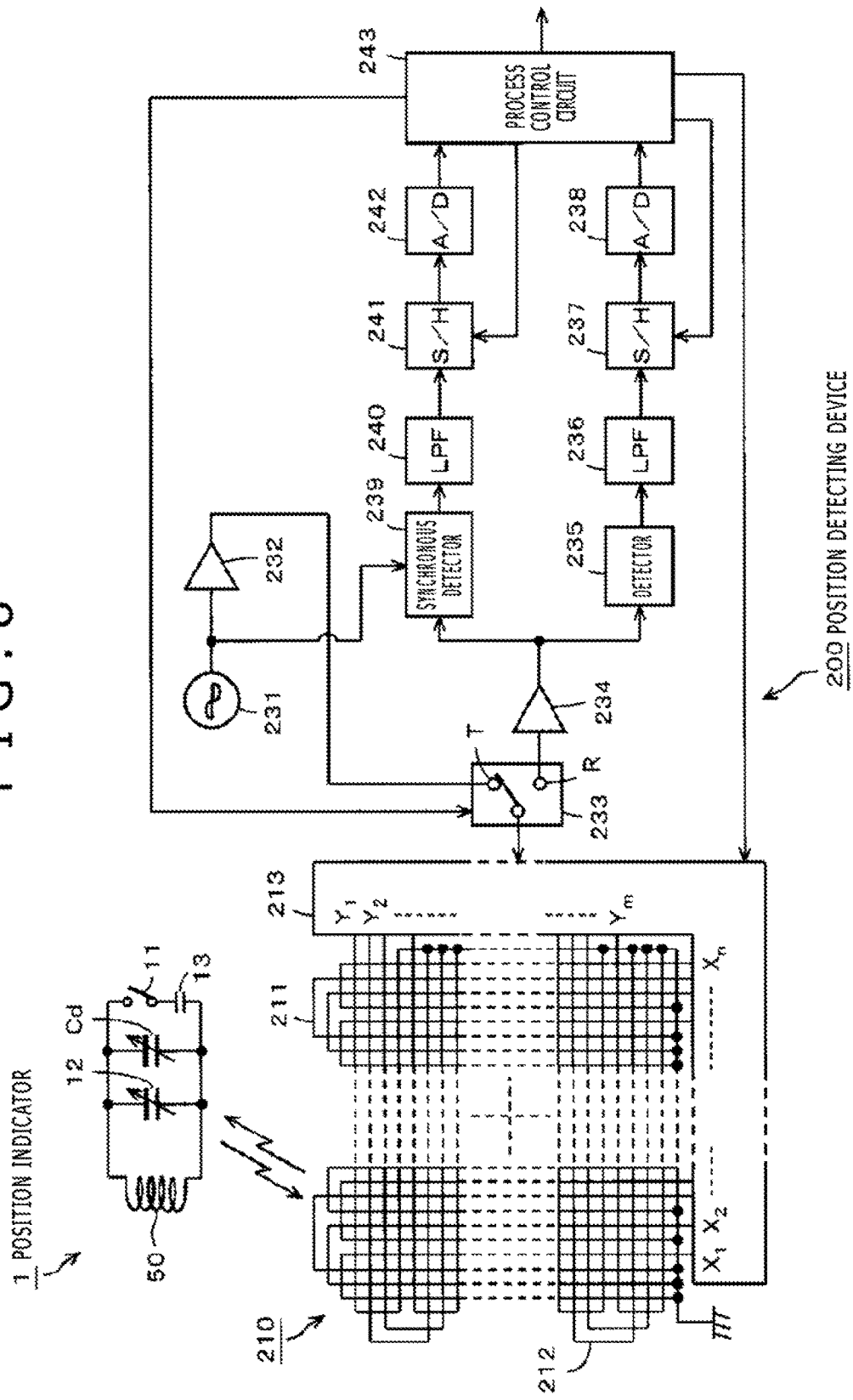
FIG. 8 is a block diagram depicting a circuit configuration example of a position detecting device to which the electronic pen according to an embodiment of the present disclosure is applied.

Now, a circuit configuration example in a position detecting device for detecting an indicated position and detecting a pen pressure by use of the electronic pen 1 according to the above embodiment will be described below, referring to FIG. 8. FIG. 8 is a block diagram depicting a circuit configuration example of the position detecting device 200 in this example.

The electronic pen 1 has a resonance circuit including the coil 50, the capacitors 12 and 13, and a capacitor (capacitance Cd) constituted of the semiconductor chip 80. In this resonance circuit, as depicted in FIG. 8, the coil 50 as an inductance element, the trimmer capacitor 12 constituted of a chip part, and the capacitor (capacitance Cd) constituted of the semiconductor chip 80 are connected in parallel, and, further, a series circuit of the side switch 11 and the capacitor 13 constituted of a chip part is connected in parallel.

In this case, according to turning-ON/OFF of the side switch 11, the connection of the capacitor 13 to the parallel resonance circuit is controlled, and resonance frequency is varied. In addition, the capacitance Cd of the capacitor (capacitance Cd) constituted of the semiconductor chip 80 varies according to the pen pressure exerted, so that the resonance frequency varies according to the pen pressure. The position detecting device 200 detects a variation in the phase of a signal from the electronic pen 1, to detect a variation in the frequency, thereby detecting whether or not the side switch 11 has been depressed and detecting the pen pressure exerted on the core body 4 of the electronic pen 1.

In the position detecting device 200, an X-axis direction loop coil group 211 and a Y-axis direction loop coil group 212 are stacked to form position detection coils 210. Besides, the position detecting device 200 is provided with a selection circuit 213 to which the X-axis direction loop coil group 211 and the Y-axis direction loop coil group 212 are connected. The selection circuit 212 sequentially selects the loop coils in one of the two loop coil groups 211 and 212.

Furthermore, the position detecting device 200 is provided with an oscillator 231, a current driver 232, a switching connection circuit 233, a reception amplifier 234, a detector 235, a low pass filter 236, a sample hold circuit 237, an analog to digital (A/D) conversion circuit 238, a synchronous detector 239, a low pass filter 240, a sample hold circuit 241, an A/D conversion circuit 242, and a process control circuit 243. The process control circuit 243 may be composed of a microcomputer or a microprocessor.

The oscillator 231 generates an alternating current (AC) signal of a frequency f0. The oscillator 231 supplies the thus generated AC signal to the current driver 232 and the synchronous detector 239. The current driver 232 converts the AC signal supplied from the oscillator 231 into a current, and sends the current to the switching connection circuit 233. The switching connection circuit 233 switches a connection destination (a transmission-side terminal T or a reception-side terminal R) to which the loop coil selected by the selection circuit 213 is to be connected, under the control by the process control circuit 243. The connection destinations are configured such that the current driver 232 is connected to the transmission-side terminal T, whereas the reception amplifier 234 is connected to the reception-side terminal R.

An induction voltage generated in the loop coil selected by the selection circuit 213 is sent to the reception amplifier 234 through the selection circuit 213 and the switching connection circuit 233. The reception amplifier 234 amplifies the induction voltage supplied from the loop coil, and sends the amplified induction voltage to the detector 235 and the synchronous detector 239.

The detector 235 detects the induction voltage generated in the loop coil, or the received signal, and sends the detected signal to the low pass filter 236. The low pass filter 236, which has a cutoff frequency sufficiently lower than the above-mentioned frequency f0, converts an output signal of the detector 235 into a direct current (DC) signal, and sends the DC signal to the sample hold circuit 237. The sample hold circuit 237 holds a voltage value of an output signal of the low pass filter 236 at a predetermined timing, specifically, a predetermined timing during a reception period, and sends the voltage value to the A/D conversion circuit 238. The A/D conversion circuit 238 converts an analog output of the sample hold circuit 237 into a digital signal, and outputs the digital signal to the process control circuit 243.

On the other hand, the synchronous detector 239 performs synchronous detection of an output signal of the reception amplifier 234 with an AC signal from the oscillator 231, and sends to the low pass filter 240 a signal at a level according to a phase difference between the output signal and the AC signal. The low pass filter 240, which has a cutoff frequency sufficiently lower than the frequency f0, converts an output signal of the synchronous detector 239 into a DC signal, and sends the DC signal to the sample hold circuit 241. The sample hold circuit 241 holds a voltage value of an output signal of the low pass filter 240 at a predetermined timing, and sends the voltage value to the A/D conversion circuit 242. The A/D conversion circuit 242 converts an analog output of the sample hold circuit 241 into a digital signal, and outputs the digital signal to the process control circuit 243.

The process control circuit 243 controls each section of the position detecting device 200. Specifically, the process control circuit 243 controls the loop coil selection in the selection circuit 213, the switching in the switching connection circuit 233, and the timings in the sample hold circuits 237 and 241. Based on input signals from the A/D conversion circuits 238 and 242, the process control circuit 243 transmits an electromagnetic wave from the X-axis direction loop coil group 211 and the Y-axis direction loop coil group 212 with a predetermined transmission continuation time.

In each loop coil in the X-axis direction loop coil group 211 and the Y-axis direction loop coil group 212, an induction voltage is generated by the electromagnetic wave transmitted from the electronic pen 1. Based on the level of the voltage value of the induction voltage generated in each loop coil, the process control circuit 243 calculates coordinate values of an indicated position in an X-axis direction and a Y-axis direction of the electronic pen 1. In addition, based on the level of a signal corresponding to a phase difference between the transmitted electromagnetic wave and the received electromagnetic wave, the process control circuit 243 detects whether or not the side switch 11 has been depressed and also detects the pen pressure.

In this way, in the position detecting device 200, the position of the electronic pen 1 coming near can be detected by the process control circuit 243. Moreover, by detecting the phase (frequency shift) of the received signal, it is possible, in the electronic pen 1, to detect whether or not the depression operating piece 16 of the side switch 11 has been depressed, and to detect the pen pressure exerted on the core body 4 of the electronic pen 1.

[Effects of Embodiment]

As has been described above, in the magnetic core coil 5 in the electronic pen 1 according to the above embodiment, the two terminals 51 and 52 are fixed directly to the ferrite core 6, so that the external shape of the magnetic core coil 5 in the direction orthogonal to the axial direction of the ferrite core 6 can be made to be substantially equal to the outside diameter of the ferrite core 6.

In addition, the winding starting end 50a and the winding ending end 50b of the coil 50 are electrically connected at those portions of the two terminals 51 and 52 which protrude in the axial direction from one end of the ferrite core 6. Therefore, the portions of the connection points also do not protrude in the direction orthogonal to the axial direction of the ferrite core 6. In this point, also, the external shape of the magnetic core coil 5 in the direction orthogonal to the axial direction of the ferrite core 6 can be made to be substantially equal to the outside diameter of the ferrite core 6.

Therefore, the external shape of the magnetic core coil 5 in the direction orthogonal to the axial direction of the ferrite core 6 can be made to be thin (small in radial size) in the same manner as the outside diameter of the core. Further, since the terminal leading-out members described in the related art example can be omitted, the length (size) in the axial direction can also be reduced.

Moreover, since the ends 50a and 50b of the coil 50 are connected directly to the two terminals 51 and 52, without using any terminal leading-out member, the number of manufacturing steps is reduced, and manufacturing cost can be reduced. Besides, direct connection to the printed circuit board 8 can be achieved by the two terminals 51 and 52, and, in this point, also, the number of production steps is reduced.

In addition, in the magnetic core coil 5 according to the above embodiment, the two terminals 51 and 52 are connected directly to the ferrite core 6, without using any terminal leading-out member. Therefore, there are effects that measurement of coil constants such as the inductance value of the magnetic core coil 5 alone is facilitated, and accuracy in management of the coil constants can be enhanced.

Besides, in the electronic pen according to the embodiment, the magnetic core coil is thin (small in radial size) and small in size, which contributes to reductions in the thickness and size of the electronic pen itself.

[Modification of Magnetic Core Coil]

In the magnetic core coil 5 according to the above embodiment, the two terminals 51 and 52 are formed at one flat surface 61P of the two opposed flat surfaces 61P and 62P of the flat ferrite core 6, and the core connecting portions 51a and 52a of the terminals 51 and 52 have lengths corresponding substantially to the whole length in the axial direction of the ferrite core 6. However, the manner in which the two terminals 51 and 52 are connected to the ferrite core 6 is not limited to that in the above example.

FIGS. 9A, 9B, 9C, 9D, and 9E depict other configuration examples of the manner in which the two terminals 51 and 52 are connected to the ferrite core 6 of the magnetic core coil 5, and each depict a state before winding of the coil 50. Each of FIGS. 9A, 9B, 9C, 9D, and 9E depicts four views of the magnetic core coil 5. The two views on the left side are views of the flat ferrite core 6 as viewed in the axial direction from the side where the tapered portion 65 is formed, whereas the two views on the right side are views as viewed from a direction orthogonal to the axial direction. In each of FIGS. 9A, 9B, 9C, 9D, and 9E, the two views on the upper side are views in the case where the flat surfaces 61P and 62P are set horizontal, whereas the two views on the lower side are views in the case where the flat surfaces 61P and 62P are set vertical.

In a magnetic core coil 5A in the example of FIG. 9A, the terminals 51 and 52 are joined with their core connecting portions 51Aa and 52Aa fitted in two grooves 68A and 69A provided on the flat surface 61P side of the ferrite core 6, in the same manner as in the example of the above embodiment. It is to be noted, however, that in the case of FIG. 9A, the length in the axial direction of the grooves 68A and 69A is set to be shorter than the length in the axial direction of the ferrite core 6, for example, to be not more than ½ times the length in the axial direction of the ferrite core 6. The other points are the same as in the example of the above embodiment.

In the case where the two terminals 51 and 52 are connected in the axial direction of the ferrite core 6, a magnetic flux path is disturbed by the terminals 51 and 52, since the terminals 51 and 52 are conductive materials, and, accordingly, the strength of electromagnetic coupling between the electronic pen 1 and the position detecting device may be lowered. Therefore, when the length of the core connecting portions 51Aa and 52Aa of the two terminals 51 and 52 is shortened as in FIG. 9A, the lowering in the strength of electromagnetic coupling between the electronic pen 1 and the position detecting device can be suppressed.

Next, in a magnetic core coil 5B in the example of FIG. 9B, grooves 68B and 69B in which to fit core connecting portions 51Ba and 52Ba of terminals 51B and 52B are provided to extend over substantially the whole length in the axial direction of the ferrite core 6, in substantially central positions of curved surfaces 63C and 64C of the ferrite core 6. Note that in the example of FIG. 9B, extension portions 51Bb and 52Bb of the terminals 51B and 52B are formed at tip portions thereof with bent portions 51Bt and 52Bt which are bent into directions orthogonal to the axial direction such as to come closer to each other. The bent portions 51Bt and 52Bt in the case of this example are formed to extend in the direction parallel to a circuit board surface of the printed circuit board up to positions above the circuit board surface of the printed circuit board, whereby soldering can be performed at the circuit board surface of the printed circuit board.

Next, in a magnetic core coil 5C in the example of FIG. 9C, which is a modification of the magnetic core coil 5B in the example of FIG. 9B, the length in the axial direction of grooves 68C and 69C formed in curved surfaces 63C and 64C of the ferrite core 6 is set to be shorter than, for example, to be not more than ½ times of the whole length of, the grooves 68B and 69B formed in the curved surfaces 63C and 64C of the ferrite core 6 in the case of the example of FIG. 9B. Therefore, the length of core connecting portions 51Ca and 52Ca of terminals 51C and 52C are also set according to the length in the axial direction of the grooves

68C and 69C. The other points of configuration of the magnetic core coil 5c in the example of FIG. 9C are the same as those of the magnetic core coil 5B in the example of FIG. 9B.

In the above examples, the grooves for the two terminals are formed in the outside surface of the ferrite core 6. However, a configuration may be adopted in which through-holes for the terminals are formed in the axial direction of the ferrite core 6, and the terminals are fitted in the through-holes, whereby the terminals are fitted and fixed to the ferrite core 6.

FIG. 9D depicts an example of such a case. In a magnetic core coil 5D in the example of FIG. 9D, two through-holes 68D and 69D are formed to extend over substantially the whole length in the axial direction of the ferrite core 6, in such a manner as to be partly connected to an inner wall surface of the through-hole 6a of the ferrite core 6 in which the core body 4 is inserted and passed. In the example of FIG. 9D, the two through-holes 68D and 69D are provided at positions on opposite sides of a center position of the through-hole 6a, in a plane which contains the center line of the through-hole 6a and which is parallel to the flat surfaces 61P and 62P.

Besides, in this example, core connecting portions 51Da and 52Da of two terminals 51D and 52D are formed in such a shape as to be fitted to the through-holes 68D and 69D, and are, for example, press fitted into the through-holes 68D and 69D, thereby being fixed to the ferrite core 6.

Note that while the through-holes 68D and 69D extending over the whole length in the axial direction of the ferrite core 6 have been formed in the example of FIG. 9D, the fitting portions for the core connecting portions 51Da and 52Da of the two terminals 51D and 52D may be a part in the axial direction, like in the example of FIG. 9C; in that case, they are not through-holes but are fitting holes.

In the magnetic core coil 5, the magnitude of a magnetic flux when a current flows through the coil 50 is smaller in the vicinity of the center line position of the ferrite core 6, or the through-hole 6a, than on the outer circumferential side surface side. Therefore, where the positions of the connecting portions 51Da and 52Da of the terminals 51D and 52D are set in the vicinity of the through-hole 6a, the influence on the magnetic flux path can be thereby reduced, so that the lowering in the strength of electromagnetic coupling between the electronic pen 1 and the position detecting device can be suppressed.

The through-holes in which to fit the two terminals to thereby fix the terminals may not be formed to be partly connected to the through-hole 6a as in the example of FIG. 9D, but may be formed quite independently from the through-hole 6a of the ferrite core 6.

FIG. 9E depicts an example of such a case. In a magnetic core coil 5E in the example of FIG. 9E, two fitting holes 68E and 69E are formed in a part in the axial direction of the ferrite core 6, quite independently from the through-hole 6a of the ferrite core 6 in which the core body 4 is to be inserted and passed. In the example of FIG. 9E, the two fitting holes 68E and 69E are provided at positions on opposite sides of a center position of the through-hole 6a, in a plane which contains the center line of the through-hole 6a and which is parallel to the flat surfaces 61P and 62P.

Besides, in this example, core connecting portions 51Da and 52Da of the two terminals 51D and 52D have a shape and a length such as to be fitted to the fitting holes 68E and 69E, and they are, for example, press fitted into the fitting holes 68E and 69E, thereby being fixed to the ferrite core 6.

Note that while a configuration in which the fitting holes 68E and 69E extending over a part in the axial direction of the ferrite core 6 are formed and the core connecting portions 51Ea and 52Ea of the terminals 51E and 52E are fitted in the fitting holes 68E and 69E has been adopted in the example of FIG. 9E, a configuration may be adopted in which like in the example of FIG. 9D, the fitting holes 68E and 69E are extended to form through-holes over the whole length in the axial direction of the ferrite core 6, the length of the core connecting portions 51Ea and 52Ea of the two terminals 51E and 52E are also set to the corresponding length, and the core connecting portions 51Ea and 52Ea are fitted to the through-holes.

In addition, while the cross-sectional shape of the ferrite core of the magnetic core coil has been a flat shape in the above embodiment, the cross-sectional shape of the magnetic material core of the magnetic core coil according to the present disclosure may be any shape.

Figure 10A:
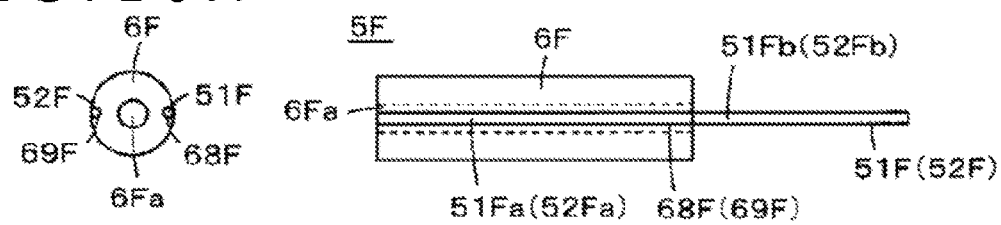
FIGS. 10A, 10B, and 10C depict figures for explaining a configuration example of a ferrite core and terminals in the magnetic core coil according to an embodiment of the present disclosure.
Figure 10B:
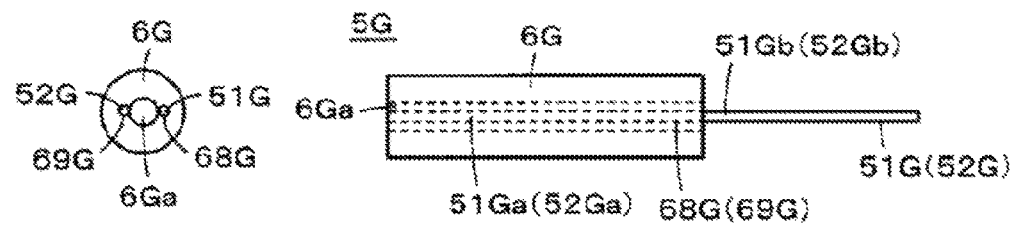

FIGS. 10A and 10B depict an example of a magnetic core coil 5F in the case where the cross-sectional shape of a ferrite core 6F as an example of the magnetic material core is a circle. The views on the left side are views of the ferrite core 6F as viewed in the axial direction from the insertion side of the core body, whereas the views on the right side are views of the ferrite core 6F as viewed from a direction orthogonal to the axial direction.

The magnetic core coil 5F in the example of FIG. 10A has a configuration in which the ferrite core 6F circular in cross section is formed with a through-hole 6Fa in which to insert a core body, and two grooves 68F and 69F extending over the whole part in the axial direction are formed in a side circumferential surface at positions spaced by an angular interval of 180 degrees from each other. Besides, core connecting portions 51Fa and 52Fa of two terminals 51F and 52F are fitted in the two grooves 68F and 69F of the ferrite core 6F, and are joined thereto with an adhesive, for example. By this, the terminals 51F and 52F are fixed to the ferrite core 6 in a state in which extension portions 51Fb and 52Fb of the terminals 51F and 52F extend protruding in the axial direction of the ferrite core 6F. While the example of FIG. 10A corresponds to the example of FIG. 9B, a configuration may be adopted in which the length of the parts where the ferrite core 6 and the terminals 51F and 52F are connected is shorter than the length in the axial direction of the ferrite core 6, such as to correspond to the example of FIG. 9C.

In addition, in a magnetic core coil 5G in the example of FIG. 10B, a ferrite core 6G circular in cross section is formed with a through-hole 6Ga in which to insert a core body, and two grooves 68G and 69G partly connected to the through-hole 6Ga are formed in the axial direction, in the same manner as in the example of FIG. 9D. In this example, core connecting portions 51Da and 52Da of two terminals 51D and 52D have a shape and a length such as to fit to fitting holes 68D and 69D, and are, for example, press fitted into the fitting holes 68D and 69D, thereby being fixed to the ferrite core 6G. Note that the length of parts where the ferrite core 6G and the terminals 51G and 52G are connected may be shorter than the length in the axial direction of the ferrite core 6G.

In the magnetic core coils 5 to 5G in the above examples, the magnetic material core is provided with the through-hole in which to insert and pass the core body, since the pen pressure detection module is disposed on the side opposite to the core body side. However, in an electronic pen having a configuration in which the pen pressure detection module is provided on the core body side of the magnetic core coil, it is unnecessary to provide the magnetic material core with a through-hole in which to insert and pass the core body.

Figure 10C:
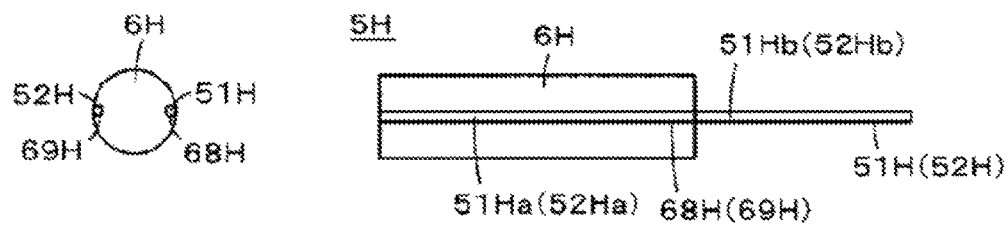

FIG. 10C depicts a configuration example of a magnetic core coil 5H in an example of such a case. Specifically, in the magnetic core coil 5H in this example, an outer circumferential side surface of a ferrite core 6H circular in cross section is formed with two grooves 68H and 69H over the whole part in the axial direction, at positions spaced by an angular interval of 180 degrees from each other. Besides, core connecting portions 51Ha and 52Ha of two terminals 51H and 52H are fitted in the two grooves 68H and 69H of the ferrite core 6H, and are joined to the latter with an adhesive, for example. By this, the terminals 51H and 52H are fixed to the ferrite core 6H in a state in which extension portions 51Hb and 52Hb of the terminals 51H and 52H extend protruding in the axial direction of the ferrite core 6H. Note that the length of parts where the ferrite core 6H and the terminals 51H and 52H are connected may be shorter than the length in the axial direction of the ferrite core 6H.

Figure 11:
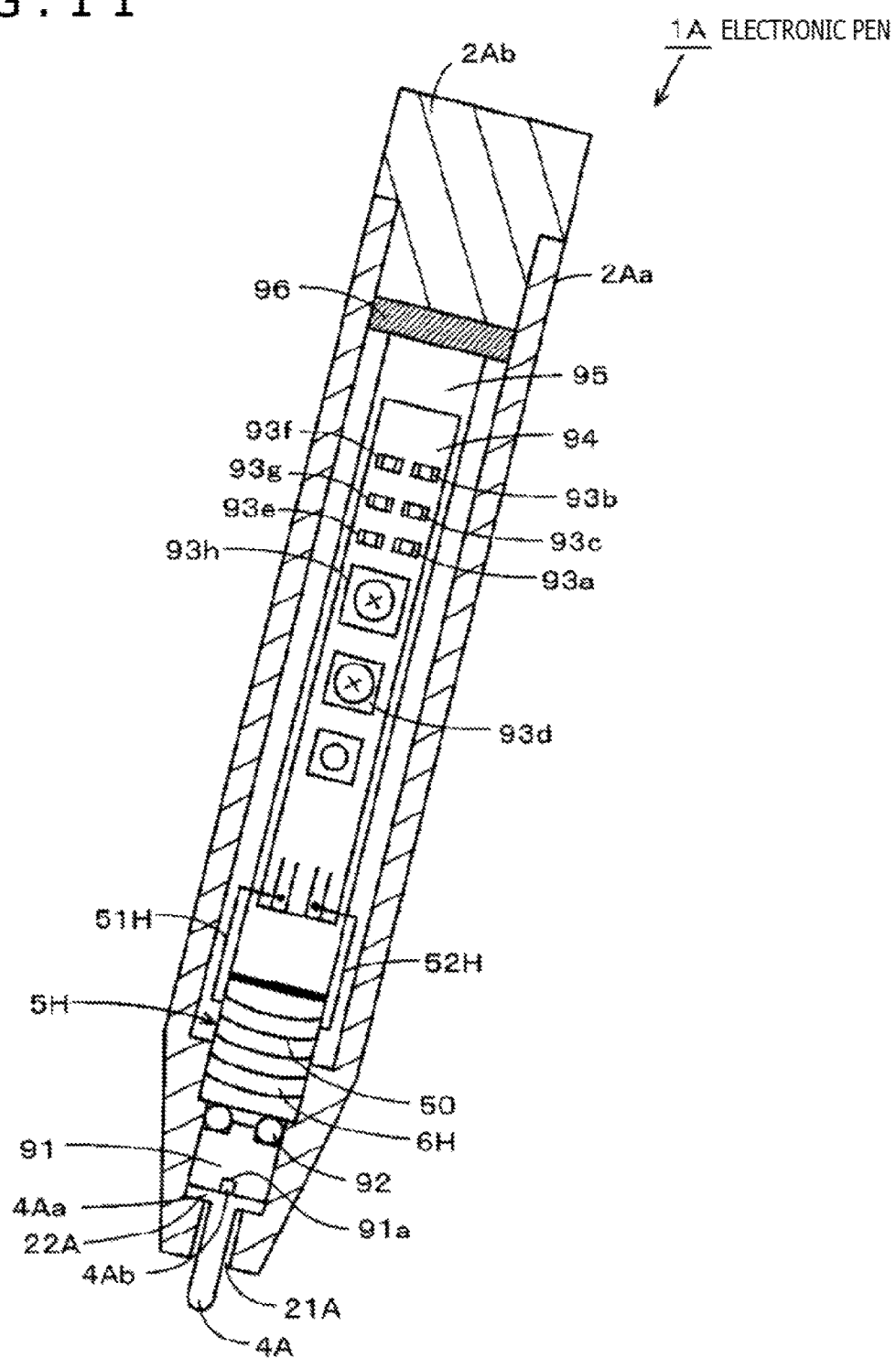
FIG. 11 is a figure for explaining an inside configuration example of the electronic pen according an embodiment of to the present disclosure.

A configuration example of an electronic pen 1A in which the magnetic core coil 5H of FIG. 10C is used is depicted in FIG. 11. FIG. 11 is a sectional view of the electronic pen 1A. The electronic pen 1A has a configuration in which an inductance constituting part of a resonance circuit varies according to a pushing force (pen pressure) exerted on the pen tip, and the electronic pen 1A has a function of detecting the pen pressure from a variation in resonance frequency based on the variation in the inductance.

Specifically, as depicted in FIG. 11, the electronic pen 1A in this example has a configuration in which the magnetic core coil 5H having the coil 50 wound around the ferrite core 6H and a magnetic material chip, in this example, a ferrite chip 91 are opposed to each other with an O-ring 92 therebetween, and a pushing force (pen pressure) is exerted on a protruding member 4A constituting the pen tip, whereby the ferrite chip 91 is brought closer to the ferrite core 6H of the magnetic core coil 5H. The O-ring 92 used here is an annular elastic member which is formed of an elastic material such as synthetic resin or synthetic rubber and which has a cross-sectional shape of the English letter "O."

When the ferrite chip 91 contacted by the protruding member 4A constituting the pen tip is brought closer to the ferrite core 6H according to the pushing force exerted on the protruding member 4A, the inductance of the coil 50 wound around the ferrite core 6H is varied accordingly, and the phase (resonance frequency) of an electromagnetic wave transmitted from the coil 50 of the resonance circuit is varied. The position detecting device detects the variation in the phase (resonance frequency) of the electromagnetic wave from the electronic pen 1A which is received by the loop coil, whereby the pen pressure exerted on the protruding member 4A of the electronic pen 1 can be detected.

In the electronic pen 1A, the protruding member 4A is provided at that end face of the ferrite chip 91 which is on the side of an opening 21A of a case main body 2Aa. In this case, the protruding member 4A is provided with a flange 4Aa for engagement with a stepped portion 22A formed at the opening 21A of the case main body 2Aa, and is formed, at that upper surface of the flange 4Aa which faces the ferrite chip 91, with a projection 4Ab to be fitted into a recess 91a formed in the end face of the ferrite chip 91. The protruding member 4A is positioned by inserting and fitting the projection 4Ab into the recess 91a of the ferrite chip 91. Then, the upper surface of the flange 4Aa of the protruding member 4A is adhered to the end face of the ferrite chip 91 with an adhesive, whereby the protruding member 4A is attached to the ferrite chip 91.

Note that in this case, while the recess 91a formed in the end face of the ferrite chip 91 is formed in a shape according to the shape of the projection 4Ab of the protruding member 4A, it is difficult to form the recess 91a in a desired shape according to the shape of the projection 4Ab, since the ferrite is a hard material and the ferrite chip 91 of the electronic pen 1A is thin (small in radial size). Therefore, the recess 91a is formed in such a shape as to enable only positioning, by loosely fitting the recess 91a to the projection 4Ab of the protruding member 4A.

Note that in addition to the above-mentioned parts, a printed circuit board 94 with a plurality of resonance capacitors 93a to 93h disposed thereon, a circuit board holder 95 for holding the printed circuit board 94, a magnetic core coil 5H connected to the resonance capacitors 93a to 93h of the printed circuit board 94 to constitute a resonance circuit therewith, and a shock-absorbing member 96 are accommodated in the case main body 2Aa of the electronic pen 1A, and their positions are fixed by a case cap 2Ab. Note that terminals 51H and 52H of the magnetic core coil 5H drawn in FIG. 11 schematically depict that the terminals 51H and 52H are electrically connected to the printed circuit board 94.

As has been described above, the electronic pen 1A of Patent Document 2 has a configuration in which the protruding member 4A is joined to the end face of the ferrite chip 91 with an adhesive, and it is unnecessary to form the ferrite core 6H with a through-hole, so that the electronic pen 1A can be made thin (small in radial size).

[Other Modifications]

Note that while the pen pressure detection module 7 using a variable-capacitance capacitor is configured to use a semiconductor chip, a configuration may be adopted in which use is made of pen pressure detection means of a known mechanism-based configuration, specifically, a variable-capacitance capacitor configuration in which a dielectric material is interposed between a first conductor and a second conductor, and the area of contact between the dielectric material and the first conductor or the second conductor varies according to the pen pressure, whereby capacitance between the first conductor and the second conductor is varied, as described, for example, in Patent Document: Japanese Patent Laid-Open No. 2011-186803.

In addition, the application of the magnetic core coil in the present disclosure is not limited to the electronic pen of an electromagnetic induction type, and the magnetic core coil can also be used as a coil for receiving charging energy in an electronic pen of a capacitive coupling type.

Besides, the use of the magnetic core coil in the present disclosure is not limited to the use in an electronic pen, and the magnetic core coil is applicable to various uses.

In addition, while the magnetic material core in the above embodiment has been a ferrite core, the magnetic material as the core material is not restricted to ferrite, and, naturally, other various magnetic materials can be used.

DESCRIPTION OF REFERENCE SYMBOLS

1 . . . Electronic pen, 2 . . . Case, 3 . . . Circuit board holder, 4 . . . Core body, 5 . . . Magnetic core coil, 6 . . . Ferrite core, 7 . . . Pen pressure detection module, 8 . . . Printed circuit board, 50 . . . Coil, 51, 52 . . . Terminal member, 68, 69 . . . Groove.

The invention claimed is:

1. A magnetic core coil, comprising:
a core formed of a magnetic material;
a coil wound around the core;
two terminals formed of a conductive material,
wherein the two terminals are fixed to the core, and first portions of the two terminals protrude from one end of the core in an axial direction of the core, and
wherein a first end and a second end of the coil are electrically connected to the first portions of the two terminals which protrude from the one end of the core in the axial direction of the core.

2. The magnetic core coil according to claim 1, wherein an outer surface of the core is formed with two grooves extending along the axial direction of the core, and second portions of the two terminals are fitted in the two grooves.

3. The magnetic core coil according to claim 2, wherein the two grooves deviate to one side in relation to a central axis of the coil.

4. The magnetic core coil according to claim 2, wherein the coil covers at least part of the second portions of the two terminals which are fitted in the two grooves.

5. The magnetic core coil according to claim 1, wherein the two terminals are partially embedded in the core, in the axial direction of the core.

6. The magnetic core coil according to claim 1, wherein the core includes a through-hole extending in the axial direction of the core that is provided in a center position of the core.

7. The magnetic core coil according to claim 6, wherein an inner wall surface of the through-hole in the core is formed with two grooves that extend in a direction along the axial direction of the core, and the two terminals are fitted in the two grooves.

8. The magnetic core coil according to claim 1, wherein the core is a solidified body of a mixture of a resin binder and a magnetic material powder.

9. The magnetic core coil according to claim 1, wherein the core has a flat shape.

10. An electronic pen comprising:
a core formed of a magnetic material;
a coil wound around the core;
a pressure detector;
a circuit board, the core, the pressure detector, and the circuit board being disposed in a tubular casing along an axial direction of the casing; and
two terminals,
wherein the two terminals are fixed to the core, and first portions of the two terminals protrude from one end of the core on a circuit board side of the core in the axial direction of the casing,
wherein a first end and a second end of the coil are electrically connected to the first portions of the two terminals which protrude from the one end of the core in the axial direction of the casing,
wherein ends of the first portions of the two terminals are connected to the circuit board and constitute a resonance circuit with a capacitor formed on the circuit board, and
wherein the pressure detector, in operation, detects a pressure exerted on a tip of a core body which protrudes from an opening of the tubular casing.

11. The electronic pen according to claim 10,
wherein the core includes a through-hole that extends in the axial direction of the casing,
wherein the core, the pressure detector, and the circuit board are disposed in the casing in this order from one side of the casing in the axial direction of the casing having the opening, and
wherein the core body is inserted and passed through the through-hole of the core and is connected to the pressure detector, and the pressure detector, in operation, detects the pressure exerted on the tip of the core body.

12. The electronic pen according to claim 11, wherein the pressure detector, in operation, detects the pressure exerted on the tip of the core body as a variation in capacitance.

13. The electronic pen according to claim 11, wherein the pressure detector, in operation, detects the pressure exerted on the tip of the core body as a variation in inductance.

14. The electronic pen according to claim 10,
wherein the pressure detector, the core, and the circuit board are disposed in the casing in this order from one side of the casing in the axial direction of the casing having the opening, and
wherein the core body is connected to the pressure detector.

15. The electronic pen according to claim 14, wherein the pressure detector, in operation, detects the pressure exerted on the tip of the core body as a variation in capacitance.

16. The electronic pen according to claim 14, wherein the pressure detector, in operation, detects the pressure exerted on the tip of the core body as a variation in inductance.

* * * * *